United States Patent [19]

Baker et al.

[11] Patent Number: 5,920,303
[45] Date of Patent: Jul. 6, 1999

[54] DYNAMIC KEYBOARD AND METHOD FOR DYNAMICALLY REDEFINING KEYS ON A KEYBOARD

[75] Inventors: Bruce R. Baker, Pittsburgh, Pa.; Brian Yoder, Waxhaw, N.C.; David Hershberger, Millersburg; Barry Romich, Wooster, both of Ohio; Eric H. Nyberg, III; Robert V. Conti, both of Pittsburgh, Pa.

[73] Assignee: Semantic Compaction Systems, Pittsburgh, Pa.

[21] Appl. No.: 08/990,740

[22] Filed: Dec. 15, 1997

Related U.S. Application Data

[62] Division of application No. 08/487,661, Jun. 7, 1995, Pat. No. 5,748,177.

[51] Int. Cl.⁶ .............................. G09G 5/00; G09G 5/36
[52] U.S. Cl. .......................... 345/133; 705/7.52; 705/7.8; 364/709.15; 364/709.16; 434/112; 340/825.19
[58] Field of Search ................................... 345/168, 133, 345/170, 172, 173; 395/796, 797, 2.69, 2.8; 340/825.19; 341/22, 28; 364/709.12, 709.16, 709.15; 434/112; 705/7.52, 7.8

[56] References Cited

U.S. PATENT DOCUMENTS

| | | | |
|---|---|---|---|
| 4,661,916 | 4/1987 | Baker et al. | 364/513.5 |
| 5,097,425 | 3/1992 | Baker et al. | 395/2 |
| 5,169,342 | 12/1992 | Steele et al. | 434/112 |
| 5,210,689 | 5/1993 | Baker et al. | 364/419 |
| 5,297,041 | 3/1994 | Kushler et al. | 364/419.15 |
| 5,299,125 | 3/1994 | Baker et al. | 364/419.08 |
| 5,309,546 | 5/1994 | Baker et al. | 395/2 |
| 5,317,671 | 5/1994 | Baker et al. | 395/2 |
| 5,612,716 | 3/1997 | Chida et al. | 345/133 |
| 5,659,338 | 8/1997 | Nakasuji et al. | 345/133 |

OTHER PUBLICATIONS

"An Interactive Keyboard for Man–Computer Communication" by Larry L. Wear and Richard C. Dorf, Proceedings of the spring joint computer conference, Atlantic City, NJ, May 5–7, 1970, pp. 607–612.

"WORDS+" Talking Screen User Manual, Copywright 1992, P.O. Box 1229, Lancaster, CA 93584.

"Lingraphica" Clinical Manual V 2.2, Copywright 1993, 1994 Tolfa Corp., 1001 N. Rengstorff Ave, Mountain View, CA 94043.

"Dynavox" by Sentient Systems Technology, Inc. Instruction Manual, Version 2.0, 1993.

"DynaSyms 2000" Manual and User's Handbook, Version 2.0 by Faith Carlson, Sentient Systems Technology, Inc., Pittsburgh, PA 15203, 1992.

"Speaking Dynamically" by King Software Development, Mayer–Johnson Co., Copyright 1993.

"DynaVox 2 and 2c" Augmentative Communication Devices: Sentient Systems Technology, Inc.; published Feb. 1996.

"Minserts Utilizing the Power of Minspeak", Prentke Romich Company, Wooster, OH; Mar. 1992, pp. 1–4.

Sentient Systems Technology, Inc. 1995 Augmentative Communication Product Catalog, Apr.–May 1995.

"Introducing Pegasus" from "The Key" Newsletter, vol. 7, No. 1; Jan. Feb. Mar. 1995; pp. 1–4.

*Primary Examiner*—Amare Mengistu

[57] ABSTRACT

A dynamic keyboard includes a plurality of keys, each with an associated symbol, which are dynamically redefinable to provide access to higher level keyboards. Based on sequenced symbols of keys sequentially activated, certain dynamic categories and subcategories can be accessed and keys corresponding thereto dynamically redefined. Dynamically redefined keys can include embellished symbols and/or newly displayed symbols. These dynamically redefined keys can then provide the user with the ability to easily access both core and fringe vocabulary words in a speech synthesis system.

124 Claims, 16 Drawing Sheets

FIG. 2B

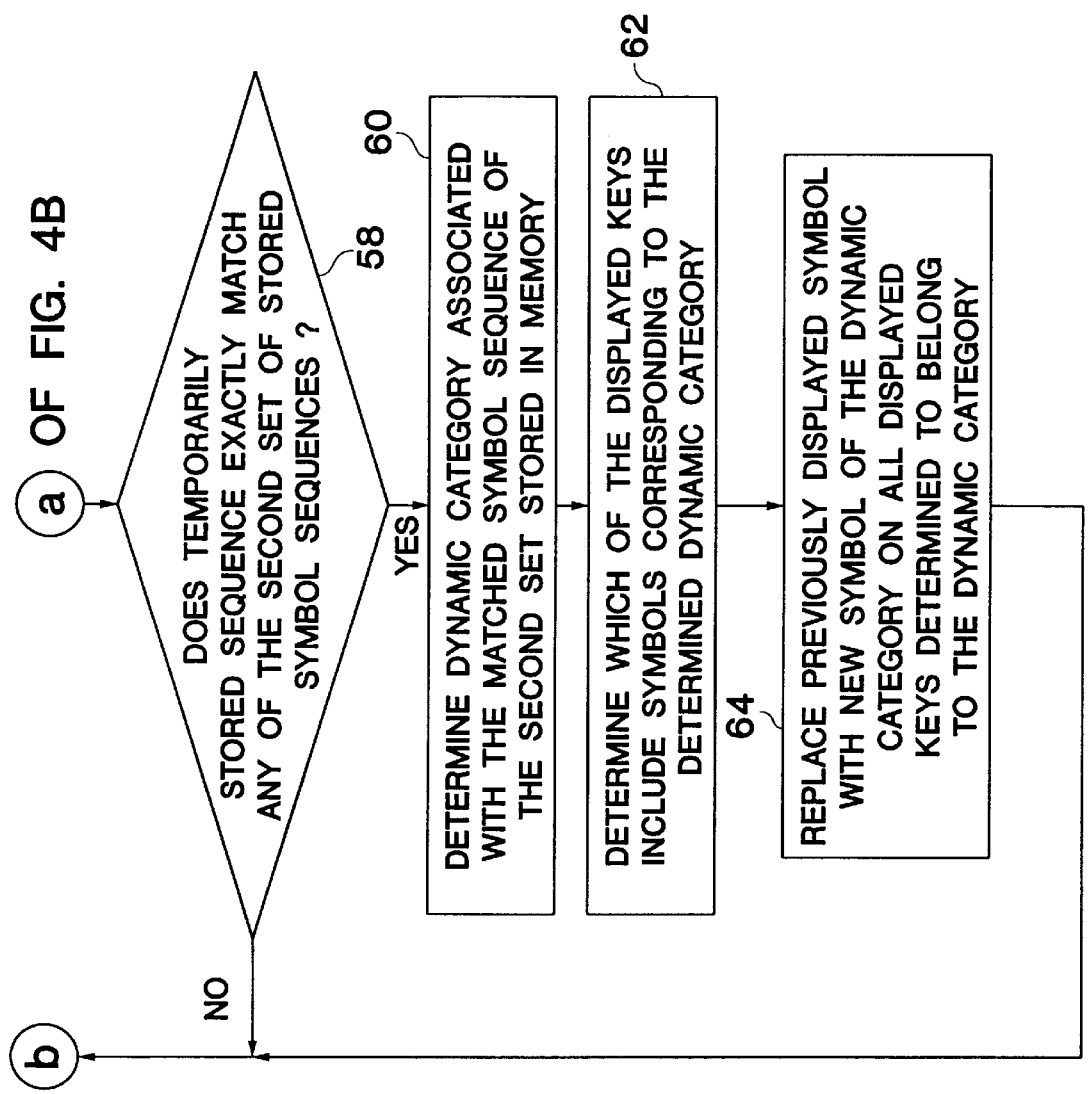

| SPEAK DISPLAY | SPEAK LAST SELECT | S OP/CL NOTEBOOK | NOTEBOOK INTERJ. | FEEDBACK CONJ. | SPEECH ADVERB | OUTPUT PREP. | DICT ADJ. | ADJ +ER | ADJ +EST | NOUN | FUNC INS A + NOUN | STORE THE + NOUN | SPELL/ MINSPEAK | ENTER | MINSERT |
|---|---|---|---|---|---|---|---|---|---|---|---|---|---|---|---|
| @ | # | 0 | 1 | 2 | 3 | 4 | 5 | 6 | 7 | 8 | 9 | ESC STOR | PRINT | ⇐ | EDIT MENU |
| OBJ. | POSS. | VERB | VERB +S | VERB +ING | VERB +ED | VERB +EN | TO + VERB | ? WORD | DEM. | NOUN PL. | THE + NOUN PL. | NUMBER | | | ⇑ |
| $ | % | ! | bl | br | ch | cl | cr | dr | fl | ( | ) | | ⇓ | EDIT MODE | |
| I+ | WE+ | | | | | | | | | | | SPK SENT | | | |
| < | = | fr | gl | gr | | | | | st | str | tr | | , MARK BLK | ⇒ | DELETE ICON |
| YOU + | THEY + | | | | | | | | | | | | | | |
| & | + | Q | W | E | | | | IGUANODON | I | O | P | | ESC | CALC | DELETE LAST SELECT |
| HE+ | PREVERB | | | | | | | PROTOCERATOPS | | | | | | | |
| * | - | A | S | D | | | DIPLODOCUS | BRACHIOSAURUS | | | | | | | DELETE WORD |
| SHE + | PREVERB +S | | | | | | | EUOPLOCEPHALUS | | | | | | | |
| < | > | | Z | X | C | V | B | N | M | . | | | RETURN | ESCAPE STORAGE | DELETE CHAR. |
| IT+ | | | | | EXIT | | | | | STOP | | | | | |
| SPEECH ON/OFF | SHIFT | CAPS LOCK | CTRL | ALT | | | | | HELP YES | | | | | STORE | CLEAR DISPLAY |
| | | | | | NO | | | | | | | | | | |

70

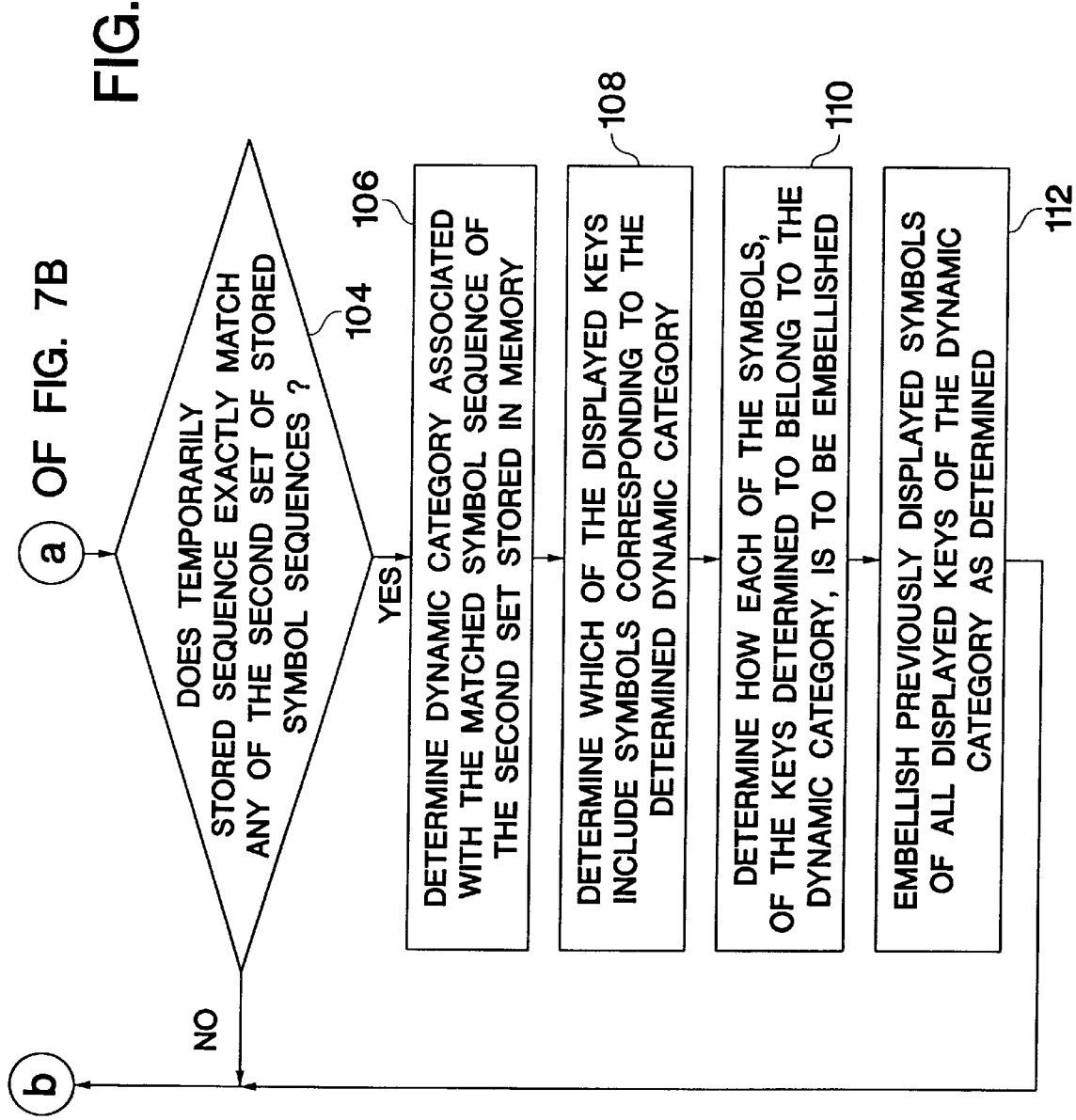

FIG. 8

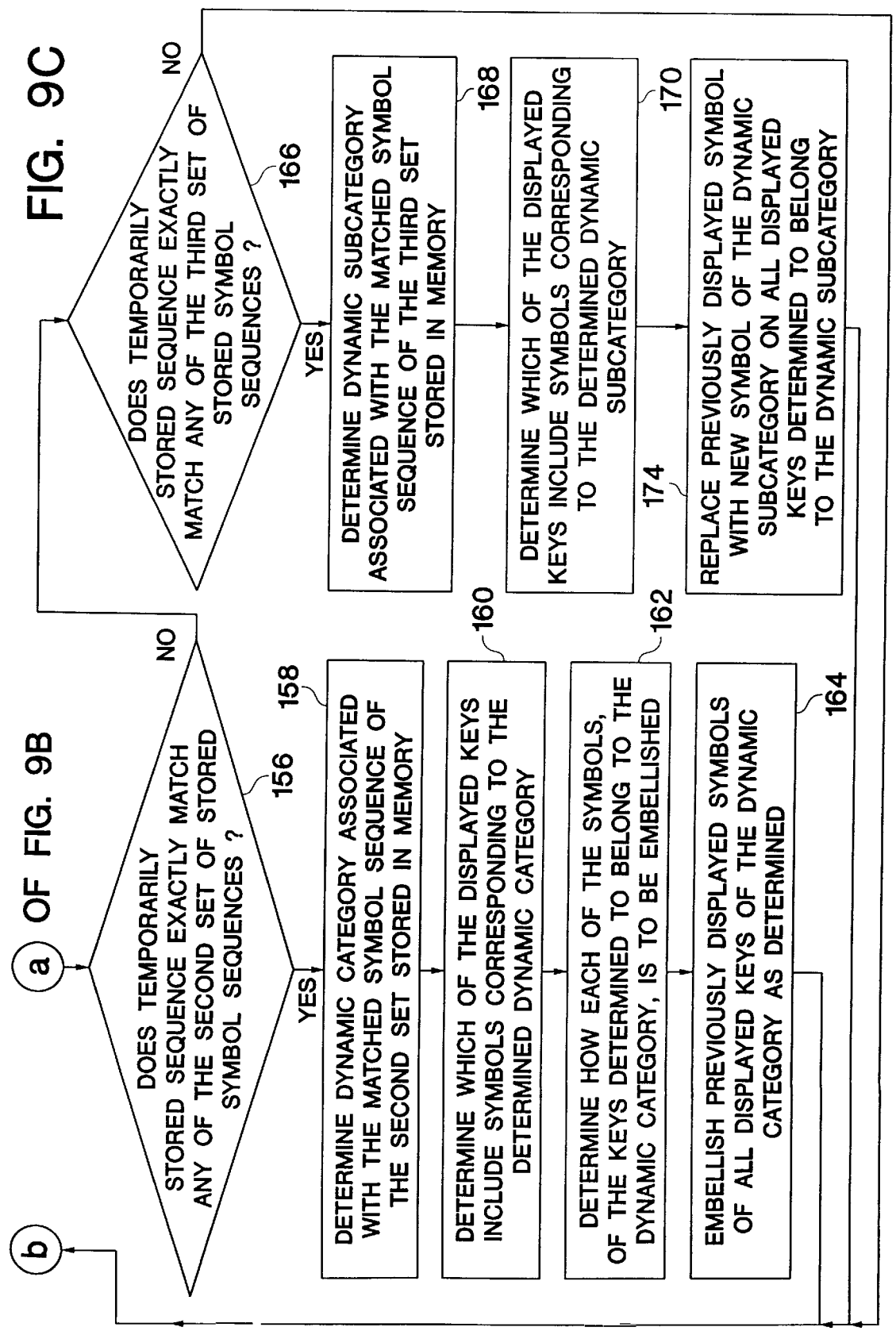

DYNAMIC KEYBOARD AND METHOD FOR DYNAMICALLY REDEFINING KEYS ON A KEYBOARD

This application is a divisional of application Ser. No. 08/487,661, filed on Jun. 7, 1995, U.S. Pat. No. 5,768,177, the entire contents of which are hereby incorporated by reference.

FIELD OF THE INVENTION

The present application is directed to a method and apparatus for utilizing symbol sequences to access stored messages and more particularly, to a dynamic keyboard for dynamically redefining at least one of a plurality of display keys to thereby provide access to alternative keyboards based upon first keys initially selected. The displayed keys include symbols which provide access to the dynamically redefined or alternative keyboards, keys on these alternative keyboards including either new symbols replacing previously displayed symbols, or embellished versions of previously displayed symbols.

BACKGROUND OF THE INVENTION

Previously, a system and method for producing synthetic single or plural word messages was developed by Bruce Baker et al. and is disclosed in U.S. Pat. No. 4,661,916 to Baker et al., issued on Apr. 28, 1987. The system was directed to a linguistic coding system and keyboard for use by people with cognitive and/or physical impairments. The coding system and associated keyboard was used to store and access messages, which included plural word messages, sentences, phrases, full names, letters, numbers, functions, or any combination thereof.

In such a system, the keyboard was coupled to a computer, or was alternately part of the stand alone entity which included a microprocessor, memory and display. The memory stored the messages for selective retrieval by the keyboard. The messages retrieved from the keyboard were then fed to a voice synthesizer, for example, which converted them through a loudspeaker to produce audible spoken messages. On this keyboard, associated with each of a plurality of keys, were polysemous (many-meaning) symbols, also known as icons. By designating selected ones of the keys and their associated symbols or icons, selected stored messages or plural word messages were accessed from the memory.

With the system described in U.S. Pat. No. 4,661,916, messages prestored in the memory could be retrieved from memory by activating a combination of symbol keys and other keys to vary the context of the polysemous symbols. Thus, a plurality of sentences could be selectively generated as a function of polysemous symbols in combination with other polysemous symbols. This allowed a user the ability to access thousands of words or messages based upon as little as one, two, or three keystrokes. Further, with symbols being polysemous, thousands of one to five symbol sequences could be generated with only a small number of keys on a keyboard. Based upon ease of use of the system, the polysemous icons or symbols utilized, and the easily memorized symbol sequence combinations, such a system became ideal for many mentally and physically challenged users for whom spelling and typing, as well as speech itself, was extremely difficult.

The system of the '916 patent allowed for an operator to go directly from thought to speech. This was possible because each key of the keyboard bore a central image or symbol which was polysemous and illustrated an important aspect of life and/or linguistic function. The keyboards could be varied depending on the intellectual level of the intended operator. Therefore, each keyboard could in itself be a language which was designed for or with a specific user. Each of the polysemous symbols were developed to be rich in associations and in combination, signal sentence or message ideas in the operator's memory. This enabled the generation of plural word or whole sentence messages by the activation of only a limited number of keys. The device allowed for the generation of many or phrases sentences or phrases and a large core vocabulary which could be easily retrieved from memory because of the ease with which the polysemous symbols on the keys portrayed the production of whole thoughts.

Sequences of icons in fixed places invoked physical memory as well as mental memory. As such sequences are learned, the body of the user tends to remember the location of key sequences in the same way a touch-typist knows the feel of the spelling of many words. After a while a user can access the keyboard even with the icons removed or covered. This situation is parallel to that of the piano player, accordion player or organist. Such access is often called automatic access. Automaticity plays a crucial role in language processing.

Thus, the aforementioned system of the Baker '916 patent provided excellent automatic access to a users "core" vocabulary. Core vocabulary items constitute approximately 75–85% of what an individual utters. Core vocabulary is the majority of the vocabulary one uses every day. If a person's speech were recorded for a five-day period, a researcher might designate a word one uses several time each day as a "core word". A word used only once in five days, however, would be a "fringe" word. Some fairly common words are fringe words for some individuals and some fairly obscure words for the general population are core words for other individuals.

Normally, seven of eight words in a typical sentence are core words for an individual and one word is typically a fringe word. In the sentence "Don't forget to tell them, no anchovies, please.", seven of the eight words are typically core words and one word is typically a fringe word. Fringe vocabulary defines vocabulary used less frequently, either chronologically or by an individual, and is relatively large when compared with core vocabularies. While seven of eight words are core words and are drawn from a relatively small pool, fringe words are a large, constantly revolving group.

If a seven-year old child with disabilities is not yet a reader, is to be mainstreamed in a typical second grade class, he/she is going to need access to a large revolving vocabulary which might be difficult to encode utilizing memorized icon sequences. If a science chapter is entitled "Let's take a walk across the desert, and what will we see?", a child may need access to ten different desert animals and five different desert plants. Able-bodied children can speak out words they are learning. They do not need to learn to spell all the specialized vocabulary words that is used in class. However, a child with significant speech and multiple impairments (SSMI) is unable to say "Gila monster" with his mouth. Therefore, this child must communicate with his communication aid or remain effectively, an observing non-participant.

Although the aforementioned Baker '916 patent provides easy and effective access to a relatively large core vocabulary, encoding and subsequently accessing these different desert animals and plants, which are typically fringe words in a vocabulary, may not be easy. A person might have to learn icon sequences for several new nouns for science class on one day and several new historical figures on a next day, etc. Encoding, entering and memorizing these new nouns might place a large burden on an individual user, classroom teacher, and family member.

Others in the field of augmentative and alternative communications (AAC) attempted to provide access to words, phrases, and sentences through spelling, through word prediction or through pictures on dynamic, graphic screens.

Spelling is often slow, difficult, and laborious for people with SSMI. Many individuals with SSMI have difficulty acquiring reading skills throughout their lifetime, and in particular, children with SSMI are late in acquiring spelling skills. Thus spelling does not represent a good option in AAC.

Typical word prediction systems function in the following manner. A user types the first letter of a word he/she wants to express. The word prediction system then presents the user on a computer screen with a numbered list of words beginning with the chosen letter. The operator visually or auditorially scans the list to see whether his/her desired word has been included. If the desired word is included, he/she selects it using the designated number. If the desired word is not in the list, he/she types the next letter. Users must then scan a second list. If the desired word is discovered in the second list, users select the designated number and the chosen word is placed in the line of text.

Dynamic screens were used which included individual words or thousands of small single meaning pictures featuring vocabulary words used in classes, for example. Sometimes these systems were arranged with special pages on which particular messages were placed under pictures which were designed to be useful in a particular environment. With these systems, a teacher could access an animal page and fifty different animals might appear. A facilitator might design a page with only ten pictures. Under each picture might be a message useful in a fast-food environment, for example.

However, such systems became extremely difficult to use for actual communication since users tended to get lost or needed to concentrate on the cognitive task of navigating through multiple vocabulary formats. Visual search tasks were very cognitively demanding. An individual may have developed automatic access to a dozen screen arrangements, but automatic access to many dozens of screens was virtually impossible. Both word prediction systems and systems employing small pictures used word prediction or the pictures to represent core and fringe vocabulary. The flaws of representing core vocabulary in such word prediction and dynamic screen systems were as follows.

Core vocabulary included words used every day. Thus, when using dynamic screens involving thousands of single meaning pictures, many keys were activated in order to access different dynamic screens, each screen containing many single meaning pictures of a particular complexity and category level, to eventually access a single core vocabulary word.

In word prediction, if the word "please" was to be accessed, the "p" key had to first be depressed. Since there were many core vocabulary words that began with "p", the user usually had to next hit the "l" key and either read through a list of words beginning with "pl" or alternatively-hit another key. The user then needed to hit the "e" key and again view a list of words beginning with "ple" to access the word "please".

The cognitive interruptions caused by such word prediction systems often increased the time necessary for language generation. Individuals often experienced the frustration of forgetting the intended utterance while reading multiple lists of words.

Similarly, in dynamic screen systems involving thousands of single meaning pictures to represent core vocabulary, multiple screens and multiple hits by a user were also necessary. This was very undesirable for a user with severe cognitive and/or physical impairments. It was not only difficult for the user to hit several different keys, but it was also very difficult for the user to navigate many different menus of pictures to assemble a sentence of many individual words. Further, since fringe vocabulary words were not commonly used, remembering how to access these words was even more difficult. Thus, the multi-menu pictorial system provided the same cognitive distractions as word prediction.

SUMMARY OF THE INVENTION

The present invention was designed to solve the aforementioned problems and to improve on the Baker '916 design utilizing sequenced polysemous symbols to access plural word messages for core vocabulary and to solve the problem of easy fringe vocabulary access.

One object of the present invention is to provide a system and method with rate enhancement abilities involving user friendly access to fringe vocabulary words.

Another object of the present invention is to utilize the AAC advantages of Baker '916, which provides for easily accessed core vocabulary messages, and to provide a teaching paradigm to enable users to learn the sequences of polysemous icons using dynamic graphical screens.

Yet another object of the present invention is to utilize the AAC advantages of Baker '916, which provides for easily accessed core vocabulary messages, and to provide dynamic graphical screens for easy access to fringe vocabulary words.

It is yet even a further object of the present invention to provide support for individuals learning icon sequences and to help individuals giving instruction to other individuals learning the icon sequences.

A further object of the present invention is to utilize polysemous symbol sequences to access alternative or dynamically redefined keyboards of other graphic embellished symbols, which can be polysemous or non-polysemous, to provide easy access to fringe vocabulary.

A still further object of the present invention is to dynamically redefine less than all of a plurality of virtual keys of a displayed keyboard in response to sequentially selected symbols to produce a dynamically redefined keyboard for accessing fringe vocabulary.

An even further object of the present invention is to dynamically redefine previously displayed symbols on a keyboard by producing newly displayed symbols of a alternative or alternative keyboard, including less than all of the keys on the keyboard, which are easily associated with fringe vocabulary.

It is still an even further object of the present invention to facilitate, self-teaching of an extended core vocabulary.

Another object of the present application is to dynamically redefine virtual keys of a display keyboard by replacing less than all of a plurality of previously displayed symbols of a plurality of keys with new symbols of a common theme.

It is still another object of the present invention to promote automatic access to a core vocabulary, and still provide transparent access to a fringe vocabulary represented graphically.

Yet another object of the present invention is to provide a system and method for producing alternative keyboards which are highly recognizable to a user and which provide easy access to various fringe words which can easily be redefined based on a users environment, such as subjects in school for example.

Still another object of the present invention is to dynamically redefine symbols of a previously displayed keyboard to produce a alternative keyboard involving symbols embellished from their previous form, still polysemous in meaning between their previous and present forms.

Still an even further object of the present application is to produce alternative keyboards of various thematically related symbols, each theme being designated by at least one sequenced symbol previously selected.

Yet a further object of the present invention is to allow a user to continuously input and display text information, while displaying dynamically redefined keys, temporarily, in place of previously displayed text on a display device or integrated input and display device.

Yet a still further object of the present invention is to provide for dynamic redefining of keys in the course of selecting a predetermined symbol sequence to access a prestored message.

Yet an even further object of the present invention is to produce an AAC system and method easily adaptable to a standard laptop computer or personal computer.

Yet another even further object of the present application is to use dynamically redefined keys to access prestored data tables or lists of words for user selection.

These and other objects of the present invention are fulfilled by providing a method for dynamically redefining a displayed keyboard, comprising the steps of:

(a) detecting selection of at least one of a plurality of keys of the displayed keyboard, each key including a corresponding displayed symbol;

(b) comparing the corresponding symbol of each at least one detected key of step (a), in sequential order of detection, to a plurality of prestored symbol sequences, each including at least one symbol in a predetermined sequence, in response to each detected selection in step (a);

(c) dynamically redefining less than all of the plurality of keys of the displayed keyboard in response to the sequenced at least one corresponding symbol matching one of the plurality of symbol sequences.

The above-mentioned and other objects of the present invention are further fulfilled by providing an apparatus, comprising:

integrated input and display device for displaying a plurality of keys of a displayed keyboard, each key including a corresponding displayed symbol, and for inputting a corresponding symbol upon selection of a key;

memory for temporarily storing a symbol sequence including the corresponding symbol of each selected key, in sequential order of selection; and control means for comparing the temporarily stored symbol sequence, in response to each key selection, to a plurality of prestored symbol sequences, each including at least one symbol in a predetermined sequence, and for dynamically redefining less than all of the plurality of displayed keys of the integrated input and display device in response to the temporarily stored symbol sequence matching at least one of the plurality of prestored symbol sequences.

The above-mentioned and other objects of the present invention are further fulfilled by providing an apparatus as mentioned above, wherein the memory temporarily stores a symbol sequence including a corresponding symbol of each selected key, in sequential order of selection, including a corresponding embellished symbol, upon selection of a key including a corresponding embellished symbol, the control means compares the temporarily stored symbol sequence including a corresponding symbol of each selected key and the corresponding embellished symbol, in sequential order of selection, to a third set of a plurality of prestored symbol sequences, each including at least one symbol and one embellished symbol in a predetermined sequence, and the control means dynamically redefines at least a portion of the displayed keyboard in response to the sequenced at least one corresponding symbol and corresponding embellished symbol matching one of the third set of a plurality of prestored symbol sequences.

The above-mentioned and other objects of the present invention are further fulfilled by providing a system and method as mentioned above, wherein the dynamic redefining includes embellishing display of a corresponding displayed symbol of at least one of the plurality of keys of the displayed keyboard.

The above mentioned and other objects of the present invention are further fulfilled by providing a system and method as mentioned above wherein the dynamic redefining includes replacing at least one corresponding displayed symbol of at least one key of the displayed keyboard with a newly displayed symbol, different from the previously displayed corresponding symbol.

The above mentioned and other objects of the present invention are further fulfilled by providing a method for dynamically redefining a displayed keyboard, comprising the steps of:

(a) detecting selection of at least one of a plurality of keys of the displayed keyboard, each key including a corresponding displayed symbol;

(b) comparing the corresponding symbol of each at least one detected key of step (a), in sequential order of detection, to a first set of a plurality of prestored symbol sequences, each including at least one symbol in a predetermined sequence and an associated prestored message;

(c) comparing the corresponding symbol of each at least one detected key of step (a), in sequential order of detection, to a second set of a plurality of prestored symbol sequences in response to the sequenced at least one corresponding symbol failing to match any of the first set of prestored symbol sequences in step (b);

(d) embellishing display of a corresponding displayed symbol of at least one of the plurality of keys of the displayed keyboard in response to the sequenced at least one corresponding symbol matching one of the second set of prestored symbol sequences in step (c);

(e) detecting selection of one of the at least one key including a corresponding embellished symbol;

(f) comparing the corresponding symbol of each at least one detected key of step (a) and the corresponding embellished symbol of step (e), in sequential order of detection, to a third set of a plurality of prestored symbol sequences, each including at least one symbol and one embellished symbol in a predetermined sequence; and (g) dynamically redefining at least a portion of the displayed keyboard in response to the sequenced at least one corresponding symbol and corresponding embellished matching one of the third set of the plurality of prestored symbol sequences in step (f).

The above mentioned and other objects of the present invention are further fulfilled by providing a method for dynamically redefining keys of a displayed keyboard, comprising the steps of:

(a) detecting selection of a plurality of keys of the displayed keyboard in sequence, each key including a displayed symbol;

(b) accessing a predetermined dynamic category based upon the sequence of symbols of detected keys selected in step (a); and (c) embellishing a plurality of displayed key symbols based upon the accessed dynamic category of step (b), to dynamically redefine less than all of a plurality of keys of the displayed keyboard.

The above mentioned and other objects of the present invention are further fulfilled by providing a method for dynamically redefining keys of a displayed keyboard, comprising the steps of:

(a) detecting selection of a plurality of keys of the displayed keyboard in sequence, each key including a displayed symbol;

(b) accessing a predetermined dynamic category based upon the sequence of symbols of detected keys selected in step (a); and (c) displaying a plurality of new symbols in place of a plurality of previously displayed key symbols based upon the accessed dynamic category of step (b), to dynamically redefine less than all of a plurality of keys of the displayed keyboard.

The above mentioned and other objects of the present invention are further fulfilled by providing an apparatus, comprising:

integrated input and display device for displaying a plurality of keys of a displayed keyboard, each key including a corresponding displayed symbol, and for inputting a corresponding symbol upon selection of a key;

memory for storing a plurality of symbol sequences, each associated with a prestored dynamic category;

control means for detecting, in sequence, selection of a plurality of keys of the displayed keyboard, for accessing a prestored dynamic category based upon the sequence of symbols of detected keys selected, and for embellishing a plurality of displayed key symbols of the integrated input and display device based upon the accessed prestored dynamic category, to dynamically redefine a plurality of keys of the displayed keyboard.

The above mentioned and other objects of the present invention are further fulfilled by providing an apparatus, comprising:

integrated input and display device for displaying a plurality of keys of a displayed keyboard, each key including a corresponding displayed symbol, and for inputting a corresponding symbol upon selection of a key;

memory for storing a plurality of symbol sequences, each associated with a prestored dynamic category;

control means for detecting, in sequence, selection of a plurality of keys of the displayed keyboard, for accessing a prestored dynamic category based upon the sequence of symbols of detected keys selected, and for displaying a plurality of new symbols in place of a plurality of previously displayed key symbols of the integrated input and display device based upon the accessed prestored dynamic category, to dynamically redefine less than all of a plurality of keys of the displayed keyboard.

The above-mentioned and other objects of the present application are further fulfilled by providing:

An apparatus comprising:

keyboard, including a plurality of keys with corresponding symbols, for inputting a corresponding symbol upon selection of a key;

memory for temporarily storing a symbol sequence including the corresponding symbol of each selected key;

control means for comparing the temporarily stored symbol sequence, in response to each key selection, to a plurality of prestored symbol sequences, each including at least one symbol in a predetermined sequence;

display for displaying a plurality of new symbols, different from the symbols corresponding to the plurality of keys, in response to the temporarily stored symbol sequence matching at least one of the plurality of prestored symbol sequences, the control means dynamically redefining less than all of a plurality of keys on the keyboard to correspond to the displayed new symbols.

The above-mentioned and other objects of the present application are further fulfilled by providing:

A method for dynamically redefining keys of a keyboard, comprising the steps of:

(a) detecting selection of at least one of a plurality of keys of the keyboard, each key including a corresponding symbol;

(b) comparing the corresponding symbol of each at least one detected key of step (a), in sequential order of detection, to a plurality of prestored symbol sequences, each including at least one symbol in a predetermined sequence, in response to each detected selection in step (a);

(c) dynamically redefining less than all of the plurality of keys of the keyboard to correspond to a new symbol, different from the included corresponding symbol, in response to the sequenced at least one corresponding symbol matching one of the plurality of prestored symbol sequences; and (d) displaying the new symbol corresponding to the dynamically redefined keys.

The above-mentioned and other objects of the present application are further fulfilled by providing:

A method for dynamically redefining a displayed keyboard, comprising the steps of:

(a) detecting selection of at least one of a plurality of keys of the displayed keyboard, each key including a corresponding displayed symbol;

(b) comparing the corresponding symbol of each at least one detected key of step (a), in sequential order of detection, to a first set of a plurality of prestored symbol sequences, each including at least one symbol in a predetermined sequence and an associated prestored message;

(c) comparing the corresponding symbol of each at least one detected key of step (a), in sequential order of detection, to a second set of a plurality of prestored symbol sequences in response to the sequenced at least one corresponding symbol failing to match any of the first set of prestored symbol sequences in step (b);

(d) embellishing display of a corresponding displayed symbol of at least one of the plurality of keys of the displayed keyboard in response to the sequenced at least one corresponding symbol matching one of the second set of prestored symbol sequences in step (c);

(e) detecting selection of one of the at least one key including a corresponding embellished symbol;

(f) detecting selection of at least one of the plurality of keys of the displayed keyboard; subsequent to detecting selection in step (e);

(g) comparing the corresponding symbol of each at least one detected key of step (a), the corresponding embellished symbol of step (e) and the corresponding symbol of each at least one detected key of step (f), in sequential order of detection, to the first set of prestored symbol sequences; and (h) accessing the prestored message associated with a prestored symbol sequence in response to the corresponding symbol of each at least one detected key of step (a), the corresponding embellished symbol of step (e) and the corresponding symbol of each at least one detected key of step (f), in sequential order of detection, matching one of the first set of prestored symbol sequences in step (g).

The above-mentioned and other objects of the present application are further fulfilled by providing:

A method for dynamically redefining a displayed keyboard, comprising the steps of:

(a) detecting selection of at least one of a plurality of keys of the displayed keyboard, each key including a corresponding displayed symbol;

(b) comparing the corresponding symbol of each at least one detected key of step (a), in sequential order of detection, to a first set of a plurality of prestored symbol sequences, each including at least one symbol in a predetermined sequence and an associated prestored message;

(c) comparing the corresponding symbol of each at least one detected key of step (a), in sequential order of detection, to a second set of a plurality of prestored symbol sequences in response to the sequenced at least one corresponding symbol failing to match any of the first set of prestored symbol sequences in step (b);

(d) replacing less than all corresponding symbols of the plurality of keys of the displayed keyboard with a newly displayed symbol, different from the previously displayed corresponding symbol, in response to the sequenced at least one corresponding symbol matching one of the second set of prestored symbol sequences in step (c);

(e) detecting selection of one of the at least one key including a corresponding newly displayed symbol;

(f) detecting selection of at least one of the plurality of keys of the displayed keyboard, subsequent to detecting selection in step (e);

(g) comparing the corresponding symbol of each at least one detected key of step (a), the corresponding newly displayed symbol of step (e), and the corresponding symbol of each at least one detected key of step (f), in sequential order of detection, to the first set of prestored symbol sequences; and (h) accessing the prestored message associated with a prestored symbol sequence in response to the corresponding symbol of each at least one detected key of step (a), the corresponding newly displayed symbol of step (e), and the corresponding symbol of each at least one detected key of step (f), in sequential order of detection, matching one of the first set of prestored symbol sequences in step (g).

These and other objects of the present application will become more readily apparent from the detailed description given hereinafter. However, it should be understood that the preferred embodiments of the invention are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention and wherein:

FIG. 2b illustrates various symbols, words, letters, parts of speech, etc., associated with keys on the optional keyboard shown in FIG. 2a, as well as corresponding virtual keys of a keyboard displayed on an integrated input and display unit of the system of the present invention;

FIGS. 4(b) and 4(c) illustrate flowcharts of the first preferred embodiment of the present application in more detail;

FIG. 5 illustrates the virtual keyboard displayed on an integrated input and display unit of the present application, particularly emphasizing an exemplary portion of the keyboard to be dynamically redefined;

FIG. 6 illustrates a virtual keyboard of the integrated input and display unit of the present application including dynamically redefined symbols replacing previously displayed symbols on the integrated input and display unit of the present application;

FIGS. 7(b) and 7(c) illustrate flowcharts of the second preferred embodiment of the present application in more detail;

FIG. 8 illustrates a virtual keyboard of the integrated input and display unit of the present application including dynamically redefined keys which are embellished versions of previously displayed symbols according to the second preferred embodiment of the present application; FIGS. 9b and 9c illustrate flowcharts of the third preferred embodiment of the present application in more detail.

DETAILED DESCRIPTION OF THE PREFERRED EMBODIMENTS

Figure 1:
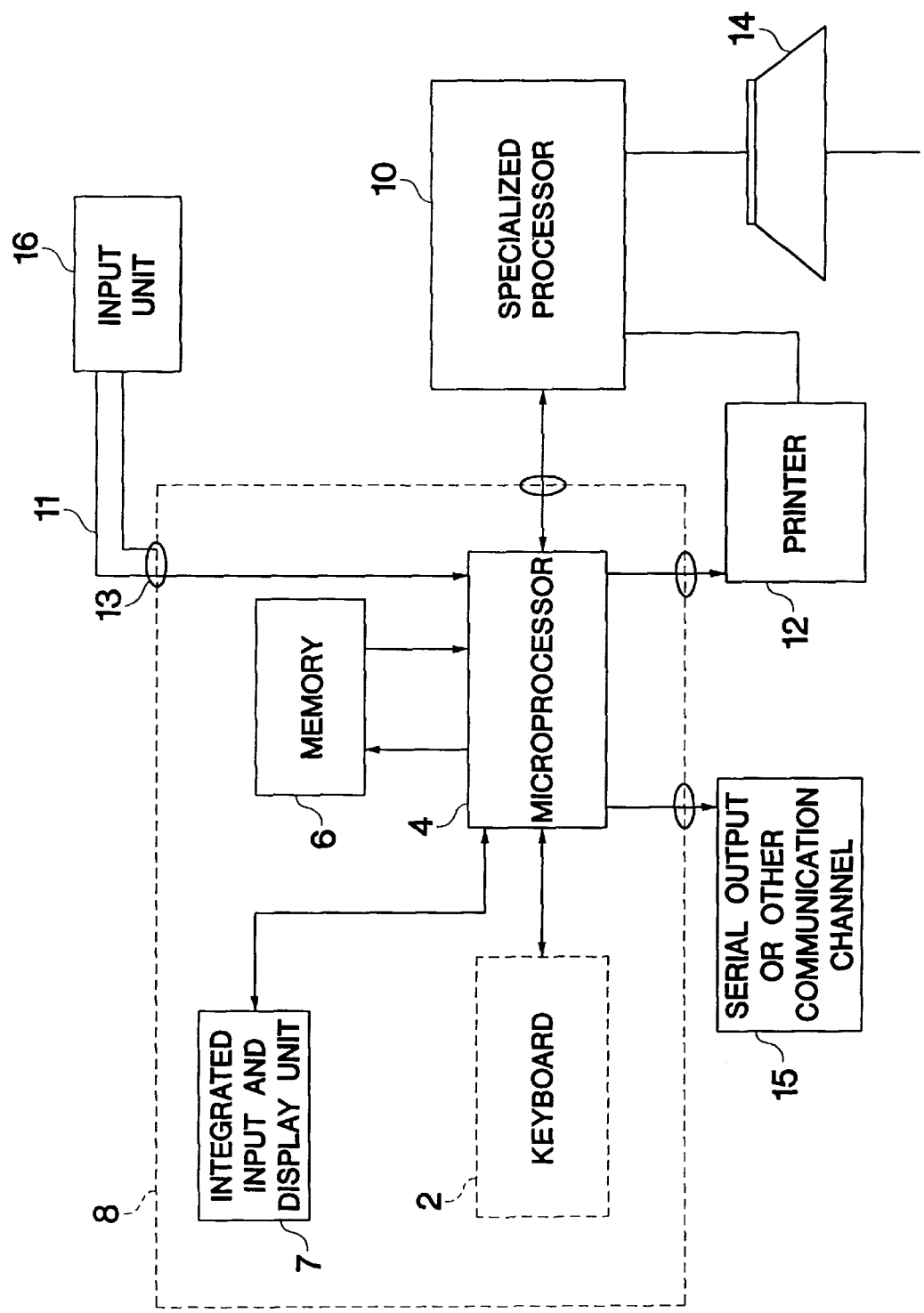
FIG. 1 of the present application illustrates a preferred embodiment of the hardware of the present application which can take the form of a stand alone unit, a lap-top computer or a personal computer.

FIG. 1 of the present application illustrates the hardware and various interconnections utilized in the system of the present application. Element 2 represents an optional hardware keyboard which can optionally be included to provide an input of a symbol or part of speech corresponding thereto; which can optionally provide input of a like symbol displayed on a virtual keyboard of the system of the present application; or which can optionally provide input of a symbol of a virtually displayed key positionally corresponding to a key on the keyboard 2. As will be explained with regard to FIG. 2a, the keyboard includes a plurality of keys 3 including row-column activated switches 9, and optionally including light emitting diodes 5. Associated with at least some of the keys on the keyboard are polysemous symbols, parts of speech, etc., as will be explained subsequently with regard to FIG. 2b.

Since the present application includes a virtual keyboard displayed on an integrated input and display unit 7, the above mentioned keyboard 2 is optional.

The keyboard 2, if present, is connected to a microprocessor unit 4 which receives key position information upon activation of a key from a keyboard 2. The microprocessor unit 4 further provides similar key position information from an integrated input and display unit 7 upon detecting selection of a key. Additionally, the microprocessor unit 4 is connected to an externally connected input unit 16, and is connected to an input port 13 of the dynamic keyboard 8 through a cable 11 for example. The microprocessor 4 is still further connected to a memory 6, the memory 6 including programmable read only memory, random access memory, EEPROM, flash memory, and an icon buffer for storing symbols in sequence of detection in response to keys of the keyboard 2 or of the integrated input and display unit 7 being selected. The memory 6, as will be explained later, stores various sets of symbol sequences used for dynamically redefining displayed keys of the integrated input and display unit 7, symbols for each of a plurality of keys selected and embellished or newly displayed symbols of dynamically redefined keys.

Figure 3:
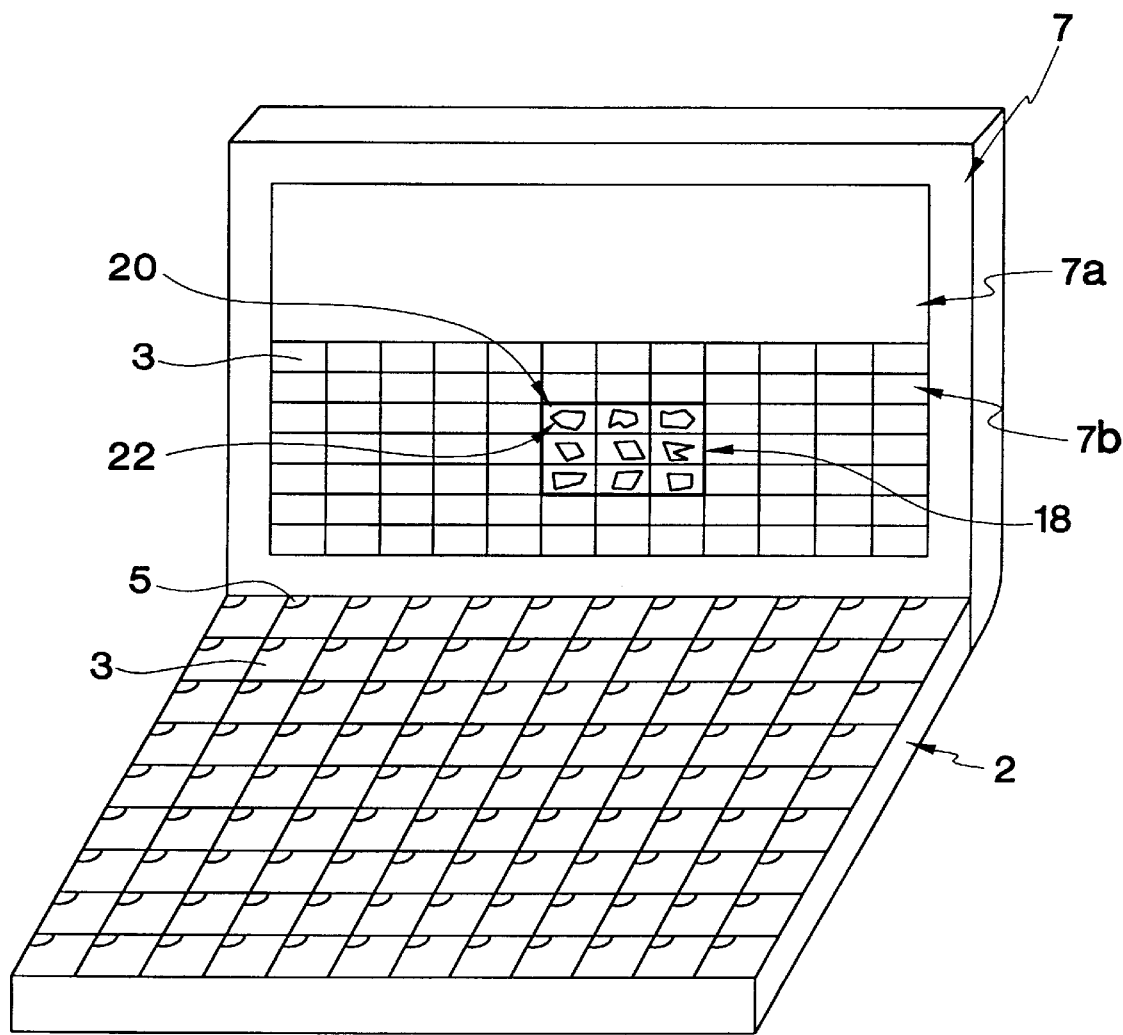
FIG. 3 illustrates a stand-alone unit or laptop computer implementing the system and method of the present invention including both a separate hardware keyboard and a virtual keyboard displayed on the integrated input and display unit.

As previously mentioned, an integrated input an display unit 7 is further connected to microprocessor 4. As its name implies, the unit 7 serves to both provide a virtual keyboard such as a touch screen panel, with keys including corresponding symbols, the symbols including polysemous icons and/or parts of speech, in a manner similar to that of keyboard 2; and to provide a display displaying the keyboard including the aforementioned symbols, which can be dynamically redefined to provide a dynamic alternative keyboard for accessing thousands of fringe vocabulary words in a manner to be described subsequently. The keyboard 2 (optional), microprocessor 4, memory 6, and integrated input and display unit 7 compose the main elements of the dynamic keyboard 8 of the present application. The dynamic keyboard 8 can be in the form of a stand alone unit; can be implemented on a personal computer; or can be implemented on a laptop computer, for example. The present application will be described with regard to a stand alone dynamic keyboard unit 8 including both a keyboard 2 and integrated input and display unit 7 as shown in FIG. 3 for example. This preferred embodiment should not, in any way, be considered limiting however.

The integrated input and display unit 7 can be a touch screen, for example. The touch screen is a thin, transparent film placed in front of a visual screen such as a cathode ray tube (CRT) or liquid crystal display (LCD) computer display. When the touch screen is touched, it is pressed against a hard surface (the computer display or a piece of glass). The pressure applied to the touch screen changes the electrical characteristics (resistance or capacitance) between the two sides of the touch screen.

Terminals on the touch screen are connected to microprocessor 4, in a manner similar to keys 3 on keyboard 2, such that the microprocessor 4 can detect altered electrical characteristics of the touch screen. Furthermore, by applying electrical signals in a vertical and horizontal orientation, the precise XY location of a virtual key selected can be detected by microprocessor 4.

The displayed symbols of the keys of the integrated input and display unit 7, namely the graphical components of the visual keyboard portion of the integrated input and display unit 7, are preferably encoded in bitmaps residing in memory 6. The microprocessor 4 generates the visual keyboard by transferring these bit patterns onto a visual display portion (CRT or LCD) of integrated input and display device 7. Individual keys include a pattern of pixels which inhabit a particular area of the visual display, each key displaying a separate symbol. Since each pixel has a corresponding memory location in memory 6, the graphics (symbol) of keys of the integrated input and display device 7 can be changed by microprocessor 4 writing a new pattern to the appropriate memory locations.

Further, a key 3 of keyboard 2 or a virtual key of integrated input and display device 7 can be dynamically redefined when a symbol sequence is selected which corresponds to a dynamic category. Information is stored in memory 6 with each symbol sequence corresponding to a dynamic category. This information details which keys 3 of keyboard 2 and of integrated input and display device 7 need to be dynamically redefined based upon access of the dynamic category, and in what manner each corresponding symbol needs to be changed (embellished or replaced with a new symbol for example). The microprocessor 4 then alters the display bitmap which results in a change on the visual keyboard of integrated input and display device 7.

Each key with a symbol, displayed on the visual display portion of integrated input and display device 7, is a virtual key which serves the purpose of indicating to a user where the touch screen should be pressed in order to activate the key. When the touch screen is pressed, the microprocessor 4 receives the XY position from the touchscreen. The microprocessor 4 uses this information to determine the visual key displayed at the positional location where the touch screen was pressed. The microprocessor 4 then determines that the key has been activated.

The messages associated with symbol sequences and accessed from memory 6 can be messages such as single words, plural words, sentences, phrases, letters, functions, or any combination thereof. The messages can be displayed in a portion 7b as shown in FIG. 3 of integrated input and display unit 7. Further, and preferably, the messages can be accessed and output through a specialized processor 10 to a speaker 14 as audible messages. The specialized processor 10 can include a microprocessor controlled speech synthesizer. The synthesizer should be a high quality synthesizer. Thus, with such a specialized processor 10 including a speech synthesizer, and with the speaker 14, a user can both correspond with another in an audible manner and can view displayed versions of the audibly produced messages on the display portion 7b of the integrated input and display unit 7.

As previously stated, an additional input unit 16 to provide for alternative key selection, can be connected through a cable 11 for example, and through an input port 13, to the main body of the system 8. This input unit 16 can be used to select a key on either keyboard 2 or on the integrated input and display unit 7 for example. The input device may be a type of scanning system operating in a row-column manner to scan the various keys of a keyboard (either of keyboard 2 and/or input and display unit 7) for potential and eventual selection, or can further optionally be a type of light scanning system for selecting a key pointed to (either of keyboard 2 and/or input and display unit 7). The various types of optional input units which can be utilized, and the procedure describing how they are utilized is further described in U.S. Pat. No. 5,297,041, to Kushler et al issued Mar. 22, 1994, the entire contents of which are incorporated herein by reference.

Finally, additional output units can be connected to the main body of the dynamic keyboard 8 of the present application such as a printer 12 connected to microprocessor 4, or a serial output or other communication channel 15 also connected to microprocessor 4. The printer can further be optionally connected to the specialized processor 10. Specific examples of the types of processor and other peripheral devices which can be utilized are disclosed in U.S. Pat. No. 5,297,041 for example.

FIG. 2 illustrates an aspect of the dynamic keyboard 8 of the present application which includes a hardware keyboard 2 separate from the integrated input and display unit 7. The keyboard 2 includes a plurality of keys 3, each including row-column switches 9 which sends signals corresponding to the position of the keys to microprocessor 4 when activated. The keyboard 2 further can optionally include visual indicators or lights corresponding to each key, such as light emitting diodes (LEDs) 5 for example.

The aforementioned visual indicators, as further designated by the circles 5 in the upper left corner of each key 3 of FIG. 3 for example are optional (the position of which should not be considered limiting in any way), and can emit a colored light indicating to a user a limited number of keys which can be activated for subsequent selection. For example, as will be described later, if a certain symbol sequence produces a dynamic redefining of at least one of the plurality of keys on the displayed keyboard of the integrated input and display unit 7, corresponding keys on the keyboard 2 illuminate corresponding light emitting diodes 5. This conveys to a user inputting through the hardware keyboard 2, which corresponding keys 3 of the hardware keyboard 2 can select a corresponding one of the dynamically redefined keys 3 of the virtual keyboard on unit 7. Further, the LEDs 5 can optionally be activated in a sequential row-column scanning manner if a sequential row-column scanning system is utilized through a separate input device 16 for example.

Still further, the predictive scanning of U.S. Pat. No. 5,297,041 to Kushler et al, the contents of which are incorporated herein by reference, can optionally be utilized to identify which of a plurality of keys 3 include symbols which are valid symbols, whereby LEDs 5 of keys 3 corresponding to valid symbols can be activated. Thus, a further discussion regarding icon or symbol prediction will be omitted for the sake of brevity in that, for such a discussion, one should refer to incorporated U.S. Pat. No. 5,297,041 to Kushler et al.

Figure 2A:
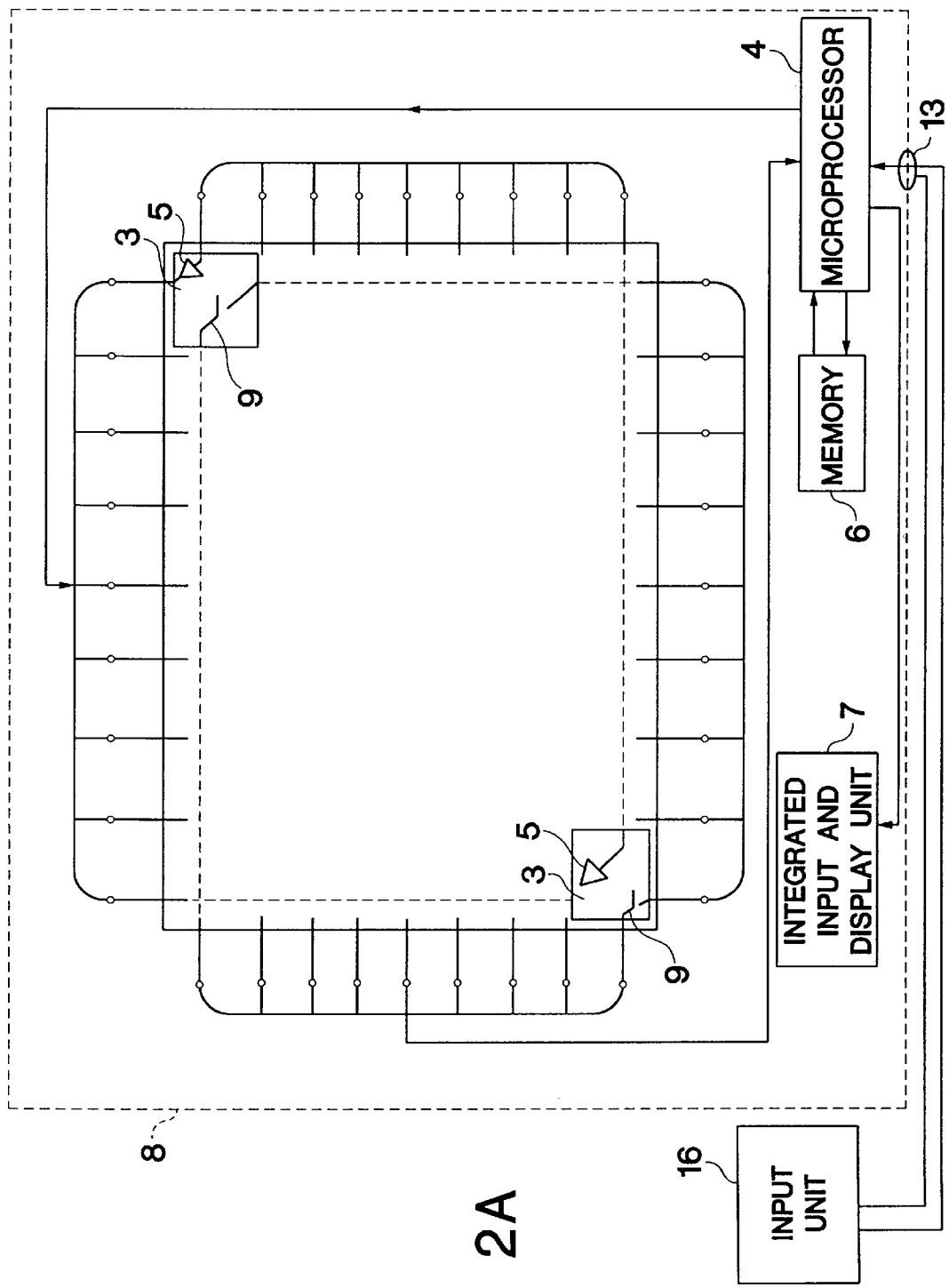
FIG. 2a illustrates the system hardware of the present application, and more specifically illustrates the aspects of an optional hardware keyboard.

Therefore, FIG. 2a illustrates the dynamic keyboard 8 of the present application including the specific keys 3, LEDs 5, and switches 9 of optional keyboard 2, as well as the connections of keyboard 2, memory 6, and integrated input and display unit 7 to microprocessor 4. FIG. 2a further illustrates port 13 through which input unit 16 is connected to microprocessor 4.

Figure 2B:
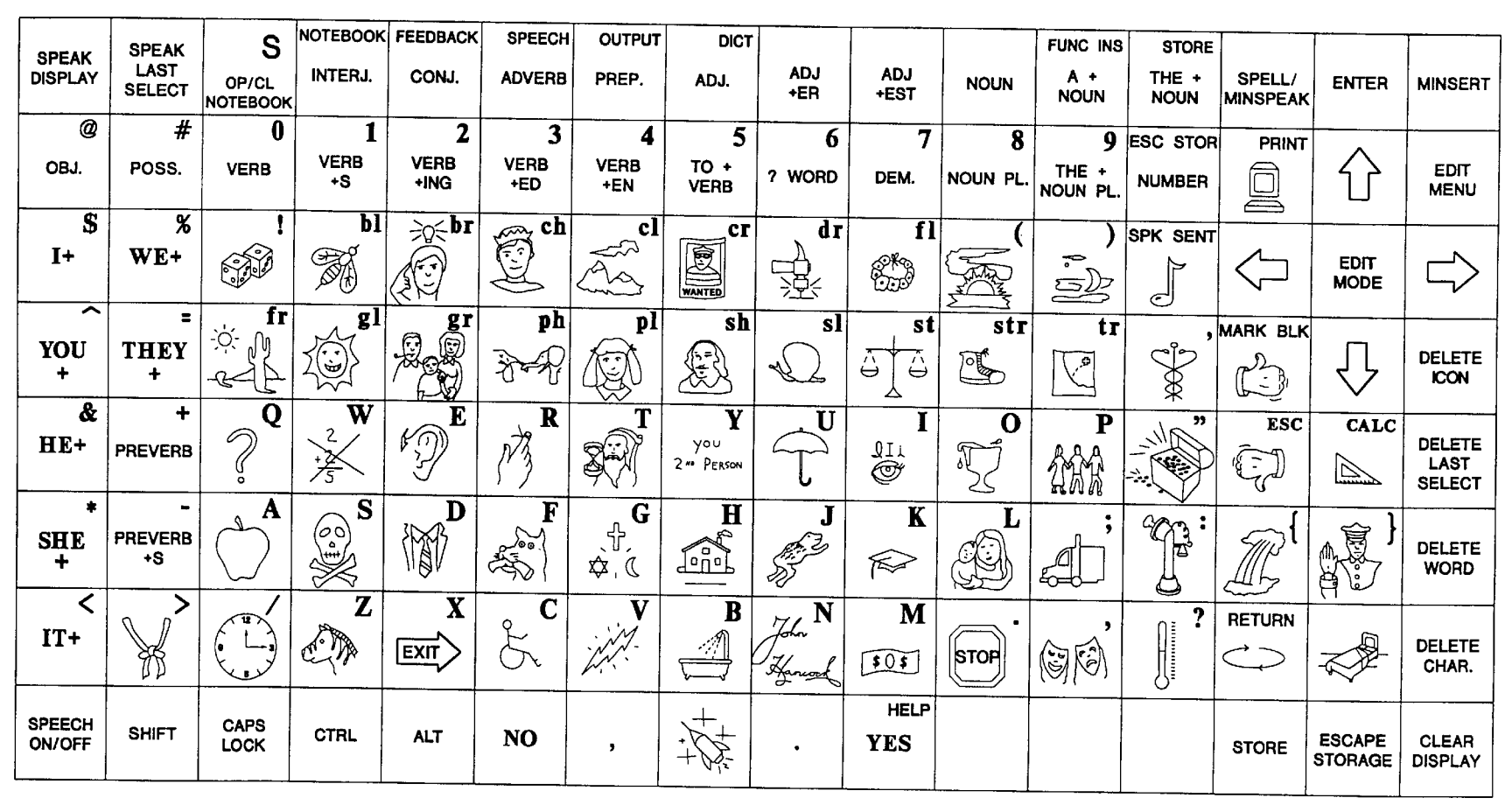

FIG. 2b illustrates an exemplary configuration of various symbols, including polysemous icons, parts of speech, etc., which are displayed on various ones of keys 3 of keyboard 2 (which is optional) and which are further displayed on positionally corresponding keys 3 of the virtual touch screen keyboard of the integrated input and display unit 7. These symbols include initially polysemous symbols which can be combined in an easily remembered associative fashion with various other symbols forming symbol sequences to access messages and/or to access dynamically redefined alternative keyboards as will be explained hereinafter. It should be noted that, preferably, both the keyboard 2, and the integrated input and display unit keyboard 7 include keys 3 and symbols positionally corresponding to one another.

FIG. 3 illustrates a preferred aspect of hardware of the present application. As shown in FIG. 3, a separate keyboard 2 is included, separate from the dynamic screen unit of integrated input and display unit 7. The separate keyboard 2 includes a plurality of keys 3 arranged in rows and columns, each key including a corresponding LED 5. It should be noted, however, that LEDs 5 are optional and need not be included with keys 3 of a keyboard 2. The various keys 3 on the keyboard 2 include the various symbols and parts of speech as illustrated in FIG. 2b for example.

FIG. 3 illustrates further aspects of the integrated input and display unit 7. The integrated input and display unit 7 includes a. first display portion 7a for displaying accessed words or messages (text) for example, as well as a second display portion 7b. The first display portion 7a may be a window to a computer application, for example. This second display portion 7b displays a virtual or touch screen keyboard including keys 3 with various symbols, including polysemous icons and parts of speech as shown in FIG. 2b, positionally corresponding to the symbols on keys 3 of the keyboard 2 for example.

FIG. 3 further illustrates a portion 18 of the virtual keyboard, including 9 keys. Each key, labeled 20, includes a symbol designated by the element 22. These keys, in an exemplary fashion which should not be considered limiting in any manner, represent a alternative or dynamically redefined keyboard including a plurality of newly displayed symbols, for example. The newly displayed symbols can be grouped together, in a 3×3 square box 18 for example, which can be highlighted or can otherwise differentiate the newly displayed symbols of the alternative keyboard from the original symbols of the original keyboard, so as to render each of the newly displayed symbols distinct from the originally displayed symbols. Highlighting changed symbols can be done, for example, by altering the display bitmap to change the background of the symbols, outline the symbols, etc. This highlighting of the alternative keyboard, designated by element 18, is optional however, and should not be considered limiting as to its size, form etc. For example, each of the keys could be separately illuminated, varied in color, varied in size, etc., so as to render them distinct from the originally displayed symbols as will be further explained in detail.

Figure 4A:
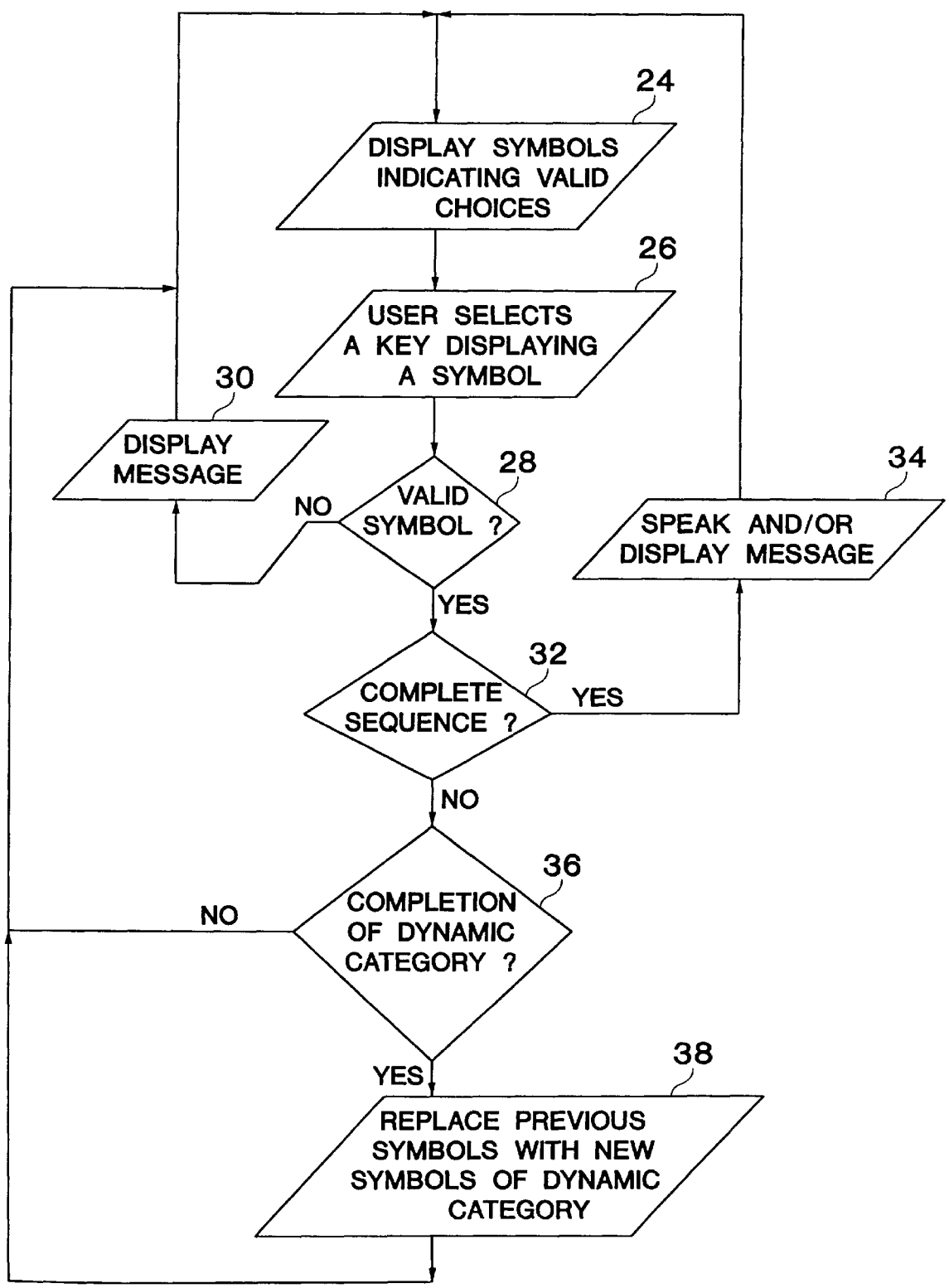
FIG. 4a illustrates a flowchart of a first preferred embodiment of the present application.

FIG. 4 includes flowcharts describing a first embodiment of the dynamic redefining method and dynamic keyboard of the present application. As shown in FIG. 4a (which includes a flowchart of a general description of this first preferred embodiment), in step 24, symbols are displayed on the virtual keyboard of integrated input and display unit 7, and particularly in the area shown by 7b in FIG. 3, indicating valid symbol choices. In a system or method not utilizing icon or symbol prediction, each of the symbols could be displayed in area 7b for example.

However, if icon or symbol prediction is utilized as described in U.S. Pat. No. 5,297,041 to Kushler et al, only symbols representing a first positional symbol of the symbol sequences in either the first, second or third set of preferred symbol sequences, as will be explained later, are displayed. It should be noted that any type of differentiation can be used to differentiate valid symbol choices from nonvalid choices, such as highlighting keys corresponding to valid symbol choices or displaying only valid symbols, and not displaying invalid symbols. Similarly, if a hardware keyboard 2 is also included, LEDs 5 of keys 3 including valid symbols can be lit.

Next, in step 26, a user selects a key with a corresponding symbol. A selection can be made by direct physical contact to one of the displayed keys of the touch-screen of displayed keyboard 7b as shown in FIG. 3 for example. Alternately, a positionally corresponding key 3 can be selected on the hardware keyboard 2. Further, a mouse could be used to select a displayed key. Various additional input methods such as optically scanning of the virtual keyboard 7b or of the hardware keyboard 2, or optically scanning in a row-column manner, can also be used. Other types of input devices represented by element 16 of FIG. 1 for example, include a switch which may be activated by a user's breath (a "puff switch"), by the user's tongue, by movement of the user's head, etc. Additionally, other direct physical contact input devices can be used, such as a headstick, for selecting and activating either a virtual key of the keyboard 7b or a positionally corresponding key 3 of a hardware keyboard 2.

Once a key 3 is selected, microprocessor 4 detects the XY positional location of the activated key, accesses a corresponding location of memory 6, and retrieves a corresponding stored symbol.

Subsequent to detection of a selected key and corresponding symbol in step 26, it is determined in step 28 whether or not the corresponding symbol is a valid symbol is step 28. This refers to the fact that valid symbols indicating a first symbol in a prestored symbol sequence of any prestored set of symbol sequences, can be indicated as a valid symbol in step 24, but then it must be determined in step 28 whether or not a key corresponding to a valid symbol has been detected as being selected in step 26. If a key and a corresponding invalid symbol has been determined to have been selected in step 28, an error message is displayed to the user in step 30 and the process returns to beginning step 24. Such a discussion regarding valid and invalid symbols is contained in U.S. Pat. No. 5,297,041 to Kushler et al.

Optionally, however, it should be noted that the icon or symbol prediction aspects of the U.S. Pat. No. 5,297,041 to Kushler can be removed from FIG. 4a. If so, then the particular symbols detected as corresponding to keys selected in step 26, can be compared in next step 32 to prestored sets of symbol sequences as will be explained hereinafter. Accordingly, it should be clear that the icon predicting of U.S. Pat. No. 5,297,041 to Kushler et al is optional and should not be considered limiting in any fashion.

Further, in any of the embodiments to be discussed hereafter, an "invalid" key could be selected. Similarly, a symbol sequence might be selected which is not one of the first, second, etc. prestored sets of symbol sequences. Each of these scenarios can be handled in a number of ways such as by ignoring the input symbols, clearing the icon buffer or recognizing that a mode switching is taking place (from symbol mode to spell mode for example). Such a mode switching technique is present in U.S. Pat. No. 5,210,689 to Baker et al., issued May 11, 1993, which is incorporated herein by reference.

Upon detection of the selected key and corresponding symbol in step 26, and optionally upon the symbol being determined as valid in step 28, the process then proceeds to step 32 in FIG. 4a. In step 32, the symbol corresponding to the initially detected selected key is compared to a first set of prestored symbol sequences stored in memory 6 for example. If this corresponding symbol matches a prestored symbol sequence, stored in the first set of prestored symbol sequences, then a message is output in step 34. This message is associated and stored with the matching prestored symbol sequence, and can be any of several types of message as previously described. The message can be displayed in display area 7a as shown in FIG. 3 and/or can be output through a specialized processor 10 and a speaker 14 to produce an audible message. This audible message allows the user to communicate with others.

If the selected corresponding symbol of the detected selected key does not complete an icon sequence, namely if the selected corresponding symbol does not exactly match one of the plurality of a first set of prestored symbol sequences in step 32, this symbol is then compared to a second set of prestored symbol sequences. It should be noted that both the first and second sets of prestored symbol sequences include at least one symbol. Further, if two or more symbols are included, these symbols are stored in a predetermined sequence. The first set of prestored symbol sequences includes a stored associated prestored message and the second set of prestored symbol sequences compared to the selected symbol in step 36 provides access to dynamic alternative keyboards, each prestored symbol sequence of the second set referring to a dynamic category. These dynamic categories will be explained as follows.

A dynamic category is used to provide access to an alternative keyboard of less than all of the keys of the original keyboard. Each dynamic category is stored with a predetermined sequence of symbols in memory 6. Further, with each dynamic category, a plurality of keys to be dynamically redefined (being less than all of the total number of keys), their positional XY location on the keyboard (hardwired and/or displayed), and the kind of dynamic redefining to take place are stored in memory 6.

In step 36, the comparison of the selected symbol to a second set of prestored symbol sequences indicates whether or not a dynamic category has been selected. If the selected symbol completes a symbol sequence corresponding to or matching one of the plurality of prestored symbol sequences of the second set, then a dynamic category has been selected in step 36. Upon determining such a match in step 36, the microprocessor 4 then determines which of the keys correspond, or are part of the alternative keyboard (including less than all of the original keys on the keyboard) of the matched dynamic category. In one preferred embodiment, the location of this alternative keyboard of the matched dynamic category includes the key positionally corresponding to the last selected symbol in the symbol sequence completing the dynamic category.

Once it is determined which keys correspond to keys of the alternative keyboard of the dynamic category, the microprocessor 4 then controls the display area 7b, and specifically the designated area corresponding to the dynamic category as shown by 18 of FIG. 3 for example, to be dynamically redefined by displaying newly displayed symbols in place of previously displayed symbols. In other words, each of the keys 20 within the window 18 (for example) of the display 7b includes symbols 22 which are transformed from the polysemous symbols originally displayed to new symbols of the dynamic category. These newly displayed symbols can then be rendered distinct from original symbols by highlighting an area around each symbol, or by highlighting an area surrounding all the keys of this alternative keyboard, including an area 18 as shown in FIG. 3 for example. It should be noted that the newly displayed symbols of this alternative keyboard can be rendered distinct from the original symbols in a variety of ways such as by varying their color, size, brightness, tone etc. from that of the original symbols.

Microprocessor 4 can map dynamically redefined keys of integrated input and display device 7 to correspond to, and to display different symbols (the symbol of the accessed dynamic category being displayed in place of the previously displayed symbol). Alternatively, the graphic of the symbol of the dynamic category can simply appear to make it obvious to the user which virtual key to activate, with the actual key mapping remaining unaltered. Upon keys being determined by microprocessor 4 as belonging to a dynamic category, new or embellished symbols corresponding thereto are stored in positionally corresponding locations in memory 6, in place of previously corresponding symbols. Thus, upon activation of a dynamically redefined key, a new or embellished symbol of a dynamic category now corresponding thereto, is accessed from memory 6.

Finally, the sequence returns to step 24, and in step 26, a user then selects a key with a corresponding symbol, such as one belonging to the dynamic category. The system then, if the symbol is valid, returns to step 32 to see if the symbol sequence including the symbol corresponding to the originally selected key stored in a first icon position, and the symbol corresponding to the newly selected key selected in step 26 and placed in a second icon position, matches one of the first set of prestored symbol sequences in step 32. If so, an associated message is then displayed and/or audibly produced in step 34.

Figure 4B:
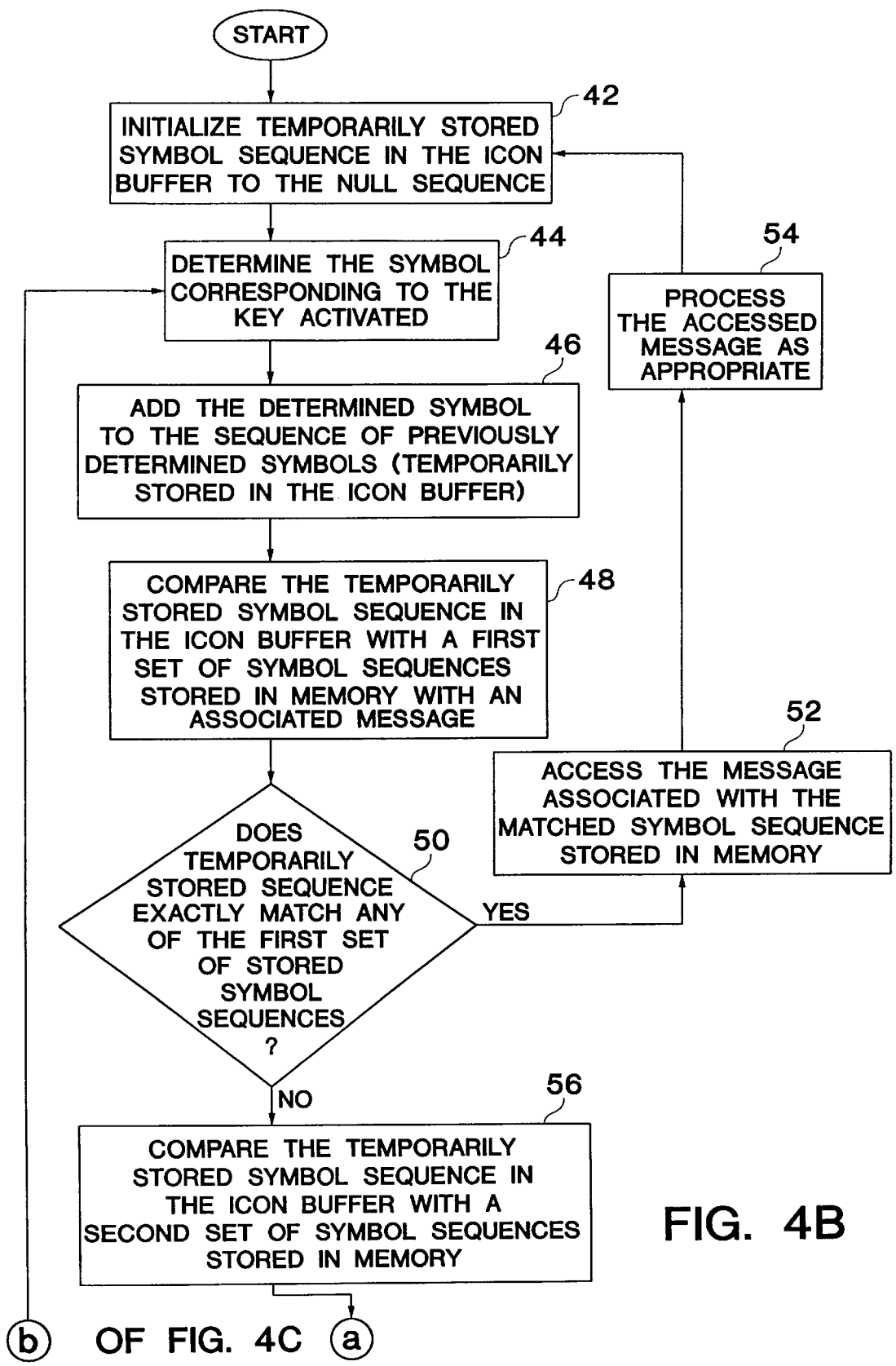

By use of such a dynamic alternative keyboard, the user has access to the fringe words, each of a common theme, established by the initially selected symbol or symbols corresponding to one of a plurality of prestored symbol sequences of a second set of a particular dynamic category. An example of such a system in use will be described with regard to FIGS. 4b and 4c, presenting a more detailed version of the operations occurring in FIG. 4a of the present application.

It should be noted, however, that it is not essential that a member of the dynamic category be selected in step 26. For example, the system could be arranged such that other valid symbols which could be utilized to complete a symbol sequence in step 32 remain displayed to the user. Thus, a user may select one of the keys which has not been dynamically redefined such that, if one of these keys is activated, with a corresponding symbol which completes a symbol sequence, a message corresponding to a core vocabulary word could be alternately output in step 34.

For example, a two symbol sequence could initially access a dynamic category in step 36 (by matching a prestored two symbol sequence of the second set), leading to the display of dynamically redefined symbols in step 38. This thereby provides access to fringe vocabulary words upon subsequent activation of a key corresponding to a newly displayed symbol of the dynamic category in step 26. However, the possibility of accessing a core vocabulary word with a three symbol sequence, none of which are members of the dynamic category, compared and matched in step 32, to output a message in step 34.

Further, selection of a key corresponding to the alternative keyboard of the dynamic category could also alternatively lead to direct access of an associated message and subsequent output in step 34. For example, the flowchart in FIG. 4a could be altered such that if a user selects a key corresponding to one of the dynamically redefined keys in a step 40 (after step 38), then selection of that key could then lead to immediate access of a fringe vocabulary word stored in association with the newly displayed symbol and output of an audible or displayed message in step 34. In such a system, a third set of symbol sequences, each being a one symbol sequence including a new symbol of a dynamic category, could be prestored in memory 6 along with an associated message (one per new symbol) to be output. Upon selection of the key corresponding to a single symbol of the dynamic category, the single new symbol could be compared to this third set of prestored single symbol sequences, and upon finding a match, an associated message could be output in step 34.

As previously explained, icon or symbol sequences, prestored in either the first or second set of symbol sequences stored in memory 6, include a least one icon or symbol. If two or more symbols are included in a symbol sequence, the symbols are stored in a positionally related symbol sequence. The symbol sequences typically vary in length from a single symbol to four or five symbols, with sequences corresponding to nouns or verbs typically involving three icons or symbols. These sequences are typically structured in a logical pattern of multiple polysemous symbols which, when combined, can trigger in the mind of a user, the particular dynamic category (related to a common theme, for example) to be accessed or a particular word or message to be accessed.

As shown in FIG. 4b, in step 42 the icon buffer of memory 6 is initialized to the null sequence such that there is no temporarily stored symbol sequence stored in the icon buffer. Essentially, the icon buffer is cleared to allow it to accept a first input icon or symbol corresponding to a first selected key.

Once a key has been activated, through activation of a key 3 on keyboard 2 or activation of a key on the integrated input and display unit 7 for example, the key position is detected by the microprocessor 4 and the symbol corresponding to the activated key is determined in step 44. For example, a key corresponding to the ZEBRA key could initially be selected and activated. If so, then this selection is detected by microprocessor 4, a symbol (in this case ZEBRA) is retrieved from memory 6 based upon the key position detected, and the ZEBRA symbol is added in step 46 to the sequence of previously determined symbols temporarily stored in the icon buffer. In this example, since the ZEBRA symbol corresponds to the first key selected, then the ZEBRA symbol is stored in a first positional location in the icon buffer in step 46.

Next, in step 48, the temporarily stored symbol sequence, in this case consisting of a single symbol stored in the first positional location, is compared with the first set of prestored symbol sequences stored in memory 6, each of the prestored symbol sequences of the first set stored with an associated message. In step 50, the microprocessor 4 compares the temporarily stored symbol sequence to the first set of prestored symbol sequences to determine whether or not the temporarily stored sequence exactly matches any of the first set of stored symbol sequences, each prestored symbol sequence including at least one symbol. If multiple symbols compose a sequence, they are located in sequential positions. For example, since the ZEBRA symbol is the only symbol stored in the icon buffer at this time, this single symbol is compared by microprocessor 4 to a plurality of prestored symbol sequences of the first set and a match is determined if a prestored symbol sequence includes only the ZEBRA symbol as its entire symbol sequence. If not, then in step 56, the temporarily stored symbol sequence in the icon buffer is compared by microprocessor 4 with the second set of prestored symbol sequences stored in memory 6.

Each of the prestored symbol sequences of the second set correspond to the one of a plurality of various dynamic categories stored in the system. As shown in FIG. 4c, in step 58, the microprocessor 4 compares the temporarily stored symbol sequence, at this time corresponding to the ZEBRA symbol, to the second set of prestored symbol sequences to determined if the temporarily stored symbol sequence exactly matches any of the second set of stored symbol sequences. If, as in this example, no dynamic categories can be accessed by activation of solely the ZEBRA symbol key, the system will return to step 44 of FIG. 4b and will await selection of a second key. In step 44, the microprocessor 4 then detects the key position of the selected key activated and the symbol corresponding to the next activated key. For example, the symbol could be the FATHER TIME symbol.

Next, in step 46, the FATHER TIME symbol is added to the sequence of previously determined symbols temporarily stored in the icon buffer. Thus, the ZEBRA symbol remains stored in the first positional location of the icon buffer, and the FATHER TIME symbol is stored in the second positional location of the icon. buffer.

The system then moves to step 48 wherein the temporarily stored symbol sequence of the icon buffer, corresponding to the ZEBRA symbol in the first positional location and the FATHER TIME symbol in the second positional location, is compared by microprocessor 4 to each of the plurality of the first set of symbol sequences stored in memory 6 along with an associated message. If a symbol sequence corresponding to the ZEBRA symbol in the first positional location and a FATHER TIME symbol in the second positional location is prestored in memory 6 as one of the first set of symbol sequences, and a match is determined in step 50, then the corresponding or associated message, stored in memory 6 with the symbol sequence including the ZEBRA symbol in the first position and FATHER TIME symbol in the second position, is accessed in step 52 and eventually processed in step 54 (via display and/or voice synthesization for example). However, this will only occur if there is an exact match of symbol sequences, this meaning that a prestored symbol sequence of the first set must include only the ZEBRA symbol in the first position and FATHER TIME symbol in the second position, and no other symbols thereafter.

Since, in this example, there is no ZEBRA symbol in the first position and FATHER TIME symbol in the second position prestored as a symbol sequence of the first set, the system moves to step 56 wherein the temporarily stored symbol sequence in the icon buffer is compared by microprocessor 4 with the second set of symbol sequences prestored in memory 6. Each of the prestored symbol sequences of the second set corresponds to a dynamic category which provide the user with a alternative keyboard to access a plurality of fringe words. This alternative keyboard, one for each prestored dynamic category, includes at least one dynamically redefined key of the original keyboard.

Moving to FIG. 4c, in step 58 the microprocessor 4 determines whether or not the temporarily stored symbol sequence exactly matches any of the second set of prestored symbol sequences. In other words, the microprocessor 4 determines whether or not selection of the ZEBRA key stored in the first positional location of the icon buffer, and subsequent selection of the FATHER TIME key stored in the second positional location of the icon buffer, provides the user with access to a dynamic category in which at least one of the plurality of displayed keys will be dynamically redefined. The present system has been established such that the ZEBRA symbol in the first positional location and the FATHER TIME symbol in the second positional location does exactly match one of the prestored symbol sequences of the second set and thus provides access to a dynamic category.

The dynamic category accessed by the ZEBRA-FATHER TIME symbol sequence is the "dinosaur" category, a category which can be easily remembered by the user in view of the fact that the ZEBRA is a rather large animal and the FATHER TIME symbol denotes going back in time, thereby allowing one to remember that such a symbol sequence acts to access a alternative keyboard including keys with symbols specifically corresponding to dinosaurs. Since types of dinosaurs are not members of an average person's core vocabulary, accessing this dynamic category provides a user with access to fringe words not normally part of their vocabulary.

In step 60, the microprocessor 4 determines that the dynamic category "dinosaurs" is associated with a matched symbol sequence of the second set prestored in memory 6, namely the sequence including the ZEBRA symbol in the first positional location and the FATHER TIME symbol in the second positional location. Once this dynamic category has been accessed, the category being prestored with the aforementioned symbol sequence of the second set stored in memory 6, the microprocessor 4 then determines which of the displayed keys, and their corresponding position, include symbols corresponding to the dynamic category. This does not mean that the keys already have such symbols displayed, since the original symbols shown in FIG. 2b are the symbols normally displayed. Instead, the microprocessor 4 accesses information prestored with the matching prestored symbol sequence indicating that twelve (for example) of the original symbols displayed on the virtual keyboard 7b of display 7 as shown in FIG. 3 must be replaced with new symbols corresponding to the dynamic category. These twelve symbols (twelve being exemplary and therefore not to be considered limiting) are shown by a designated area 68 of FIG. 5 for example.

Figure 5:
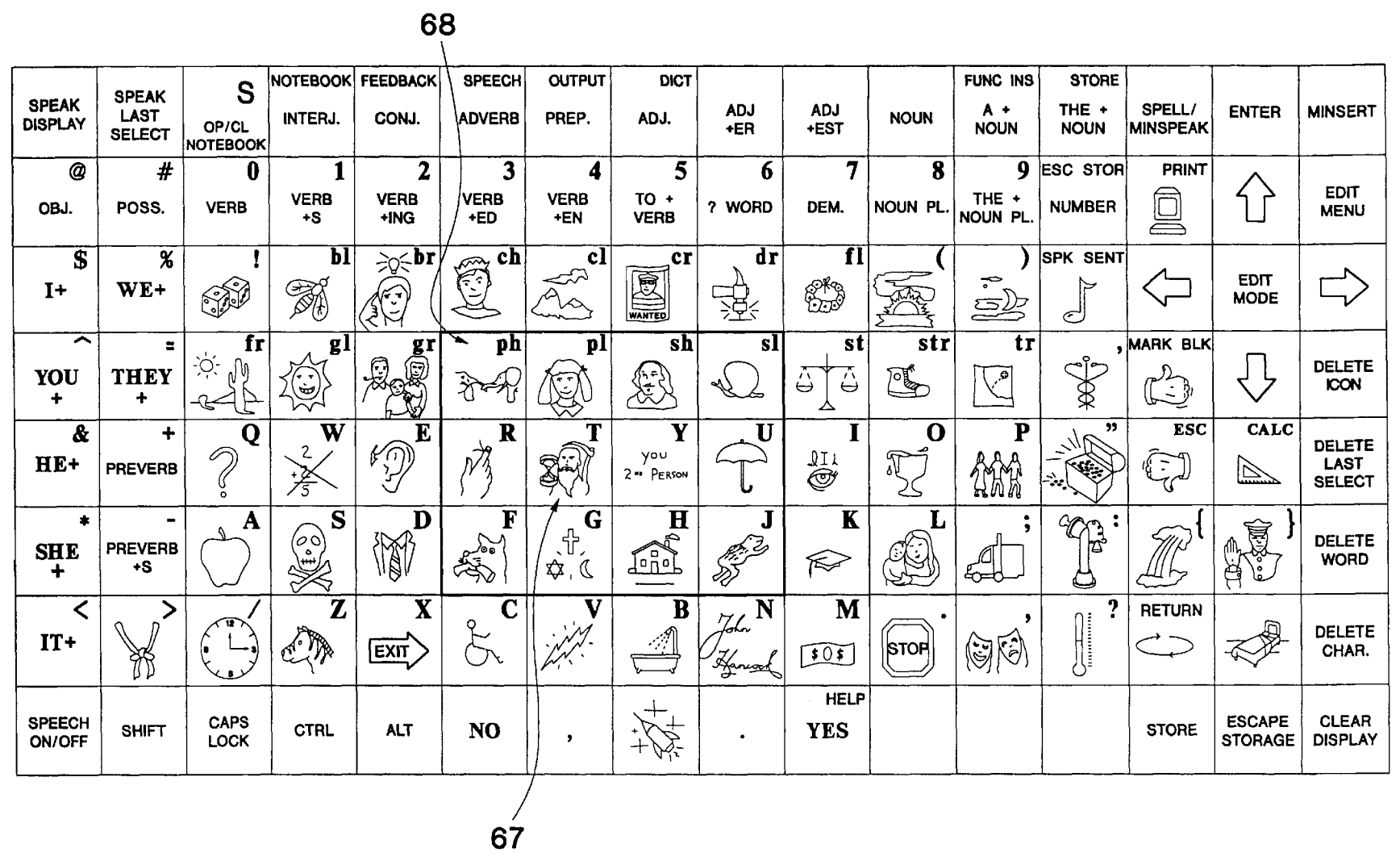

Next, in step 64, the previously displayed symbols located within the twelve symbol box represented by 68 of FIG. 5 are then replaced, on the display 7b of the integrated input and display device 7, with new symbols of the dynamic category on all displayed keys determined to belong to the dynamic category. This is shown in FIG. 6 for example, wherein the box identified by element 70 illustrates twelve newly displayed dinosaur symbols, (replacing the previously displayed symbols), as well as a display of the corresponding names of the particular dinosaurs. The display can include the dinosaur symbols only, or the names of the dinosaur symbols only, or both, if desired.

Microprocessor 4 maps dynamically redefined keys of the integrated input and display device 7 to different virtual keys of different symbols. Namely, in memory 6, at the location previously storing the FATHER TIME symbol, the TYRANNOSAURS symbol will be stored. Further, the graphics of the corresponding virtual key (XY) location on integrated input and display device 7 are changed to the new symbol pattern by writing the new pattern to the appropriate corresponding memory location of memory 6.

Further, as will be recognized when viewing both FIGS. 5 and 6, the new alternative or dynamic keyboard shown by element 70 of FIG. 6 can optionally positionally correspond to the area 68 of FIG. 5. More particularly, at least one of the twelve symbols of the new alternative keyboard, which correspond to keys dynamically redefined, include the positional location of the FATHER TIME key 67. Since the user's attention has already been focused on a FATHER TIME key upon its selection as a second symbol in the symbol sequence of the example explained, it is best to dynamically redefine the existing keyboard by replacing symbols proximately located to the last symbol selected. Accordingly, symbols including the FATHER TIME symbol and other symbols proximately located to each other and to the FATHER TIME key 67 of FIG. 5, have been dynamically replaced in step 64 with the various dinosaur symbols pertaining to the particular dynamic category accessed.

Further, the symbols of the dynamic category corresponding to the symbol sequence of the ZEBRA symbol and FATHER TIME symbol are thematically related, i.e. each of the newly displayed symbols all pertain to dinosaurs. The theme is established by the particular symbol sequence including a ZEBRA symbol in a first positional location and a FATHER TIME symbol in a second positional location invoking the "dinosaur" category in the mind of the user. Preferably, each prestored symbol sequence of the second set corresponds to a theme which will lead to display of new symbols providing access to thematically related fringe vocabulary words.

With regard to positional location of the newly displayed symbols of this alternative keyboard, they can optionally be located anywhere on the virtual keyboard 7b, or can further be optionally located on a different portion of the display screen such as in a portion of display area 7a, on keys separate from the rest of the displayed keys in area 7b. Still further, these dynamically redefined keys displaying new symbols can be differentiated from the original symbol keys as a group, via the highlighted box 70 as shown in FIG. 6. Alternatively, or in addition thereto, the color of these newly displayed symbols can be different as compared to the color of the original symbols, namely these symbols can be black and white while the other previously displayed symbols can be displayed in color for example. This provides for a clear differentiation between symbols corresponding to dynamically redefined keys, and symbols corresponding to original keys.

Finally, the microprocessor 4 determines whether or not a key with a newly displayed symbol has been activated. If a user has selected and activated one of the particular dinosaur keys, then the system, returning to step 44 in FIG. 4b, determines the particular dinosaur key selected. The newly displayed symbol, corresponding to the TRICERATOPS key for example, is then added to the symbol sequence in the icon buffer. Thus, in step 46, the symbol sequence stored in the icon buffer becomes the ZEBRA key in the first positional location, the FATHER TIME key in the second positional location, and the TRICERATOPS key in the third positional location.

The microprocessor 4 then compares, in step 48, this temporarily stored symbol sequence to the prestored symbol sequences of the first set. Next, upon determining that a symbol sequence match occurs in step 50, then the message "TRICERATOPS" associated with the aforementioned matched symbol sequence prestored in memory 6 is accessed in step 52. The message is then processed (via display and audible output for example) in step 54. This thereby provides the user with a method for accessing not only core vocabulary in an efficient and highly symbolic manner, but also with the added ability to access fringe vocabulary words of various themes or dynamic category, based upon the dynamic redefining of the virtual keyboard displayed on the integrated input and display device 7.

As previously explained, the system can optionally be designed to automatically access a message upon a user selecting a newly displayed symbol of a dynamic category. Thus, if a comparison of the selected new symbol to a third set of prestored one symbol sequences yields a match, then a message is immediately accessed by microprocessor 4, without the need to add the newly accessed symbol to a symbol sequence. Further, a user can optionally select a key displaying a third symbol (of the symbol sequence) which may not be a member of the dynamically redefined or alternative keyboard shown within the area 70 of FIG. 6 for example. Certain third symbols which provide access to a prestored message, based upon their being part of a prestored symbol sequence of the first set, can remain highlighted or otherwise acknowledged as being valid in display area 7b for example, or can include a corresponding LED 5 which remains lit on the keyboard 2, indicating that they are valid keys.

The system can further be preferably designed to allow a user to select and activate one of the keys 3 of a hardware keyboard 2 which positionally corresponds to a key of the dynamic category of the virtual keyboard 7b. Such keys of the dynamic category can be visually indicated on the hardware keyboard 2 as being valid keys by activation of a corresponding LED 5 for example. Thus, if the user again selects the FATHER TIME key 67 shown in FIG. 5 (after the ZEBRA and FATHER TIME symbols), then the hardware keyboard 2 provides for an alternate way to access the TYRANNOSAURS symbol since the FATHER TIME key on the hardware keyboard 2 positionally corresponds to the newly displayed TYRANNOSAURS key on display 7b. Accordingly, although the ZEBRA and FATHER TIME symbol will be placed in the first and second positions of the icon buffer, upon the dynamic category being established in step 60 of FIG. 4c, subsequent activation of the hardware key 2 displaying the FATHER TIME symbol will actually lead to the input of the TYRANNOSAURS symbol into the icon buffer since the TYRANNOSAURS is the symbol which is newly displayed and thus will be made part of the subsequent temporarily stored symbol sequence.

As previously stated, upon accessing a particular dynamic category, certain symbols and corresponding graphics are replaced in memory 6 with new symbols and new graphics. The memory location of memory 6 now containing the new symbol and new graphics, corresponds to a common XY positional location on both keyboard 3 and integrated input and display device 7. Thus, the virtual key on integrated input and display device will both correspond to and display the new symbol, and the key 2 on the keyboard 3, positionally corresponding to the virtual key, will correspond to (although not display) the new symbol.

Although this may appear to be somewhat confusing, this can actually be advantageous for a user who might be able to view a dynamic touchscreen keyboard, but who may not have the ability to activate a key on the touchscreen keyboard as easily as he could activate a key 3 on the hardware keyboard 2. By establishing the positional correspondence between the virtual display keyboard in area 7b and the hardware keyboard 2, a type of alternate input method is provided to the user.

Figure 7A:
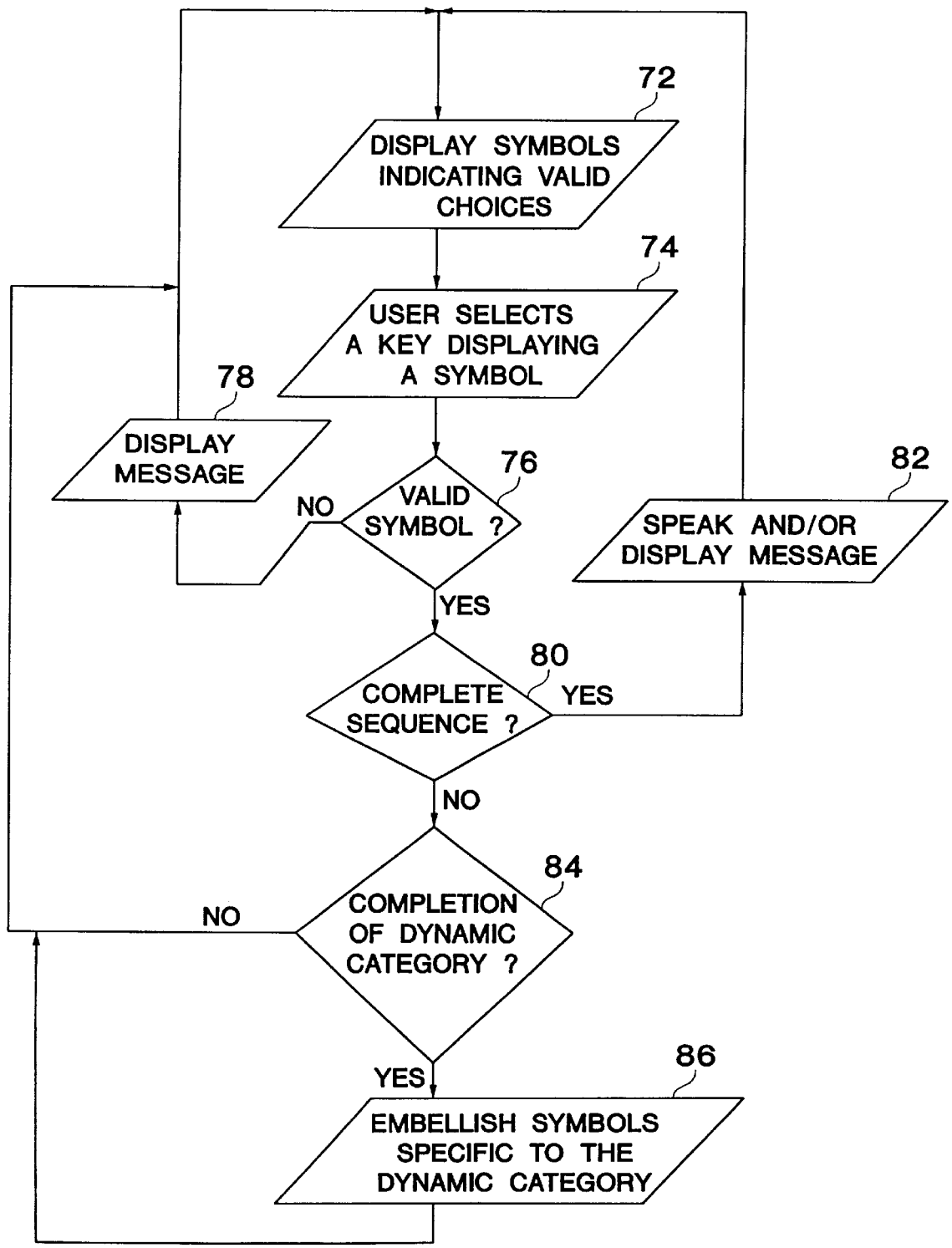
FIG. 7a illustrates a flowchart of a second preferred embodiment of the present application.
Figure 7B:
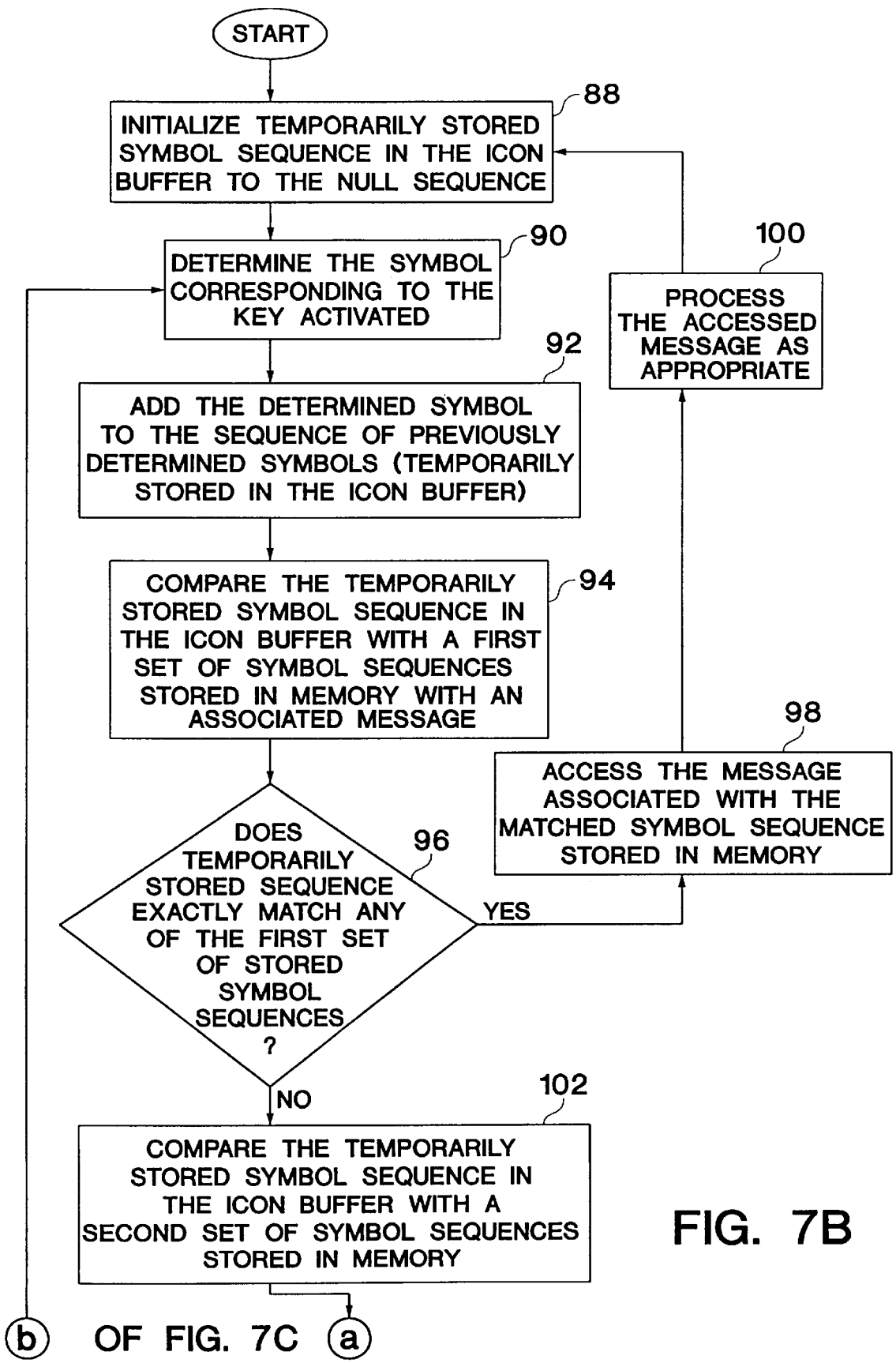

FIGS. 7a–c illustrate a second preferred embodiment of the present application for dynamically redefining at least one of a plurality of keys on the displayed keyboard in response to a selected symbol sequence matching one of a plurality of prestored symbol sequences. In this second preferred embodiment, instead of replacing existing symbols with newly displayed symbols of a particular dynamic category, existing symbols are instead embellished in a certain manner. This embellishing can be in the form of adding words corresponding to the new meaning of these symbols in the context of their dynamic category; changing colors of these symbols to reflect their new meaning in the dynamic category; physically altering the shape or size of these symbols, etc. These embellished symbols, in one preferred embodiment, are only slightly altered such that the original symbol is basically maintained. This allows the embellished symbols to be somewhat polysemous when taken in context with their original symbol, to further allow the user the ability to easily recognize these symbols in their new context within the dynamic category itself. For example, the idea symbol shown in FIG. 5 on the key including the small letters "br" can be included as a dynamic category key of the fruit category, to allow access to the fruit "peach". This is shown as key 115 in FIG. 8 for example. A user can easily recognize or remember that such a symbol can be used to access the fringe word "peach" by associating "idea" with "a peach of an idea", thereby rendering the symbol polysemous.

Figure 8:
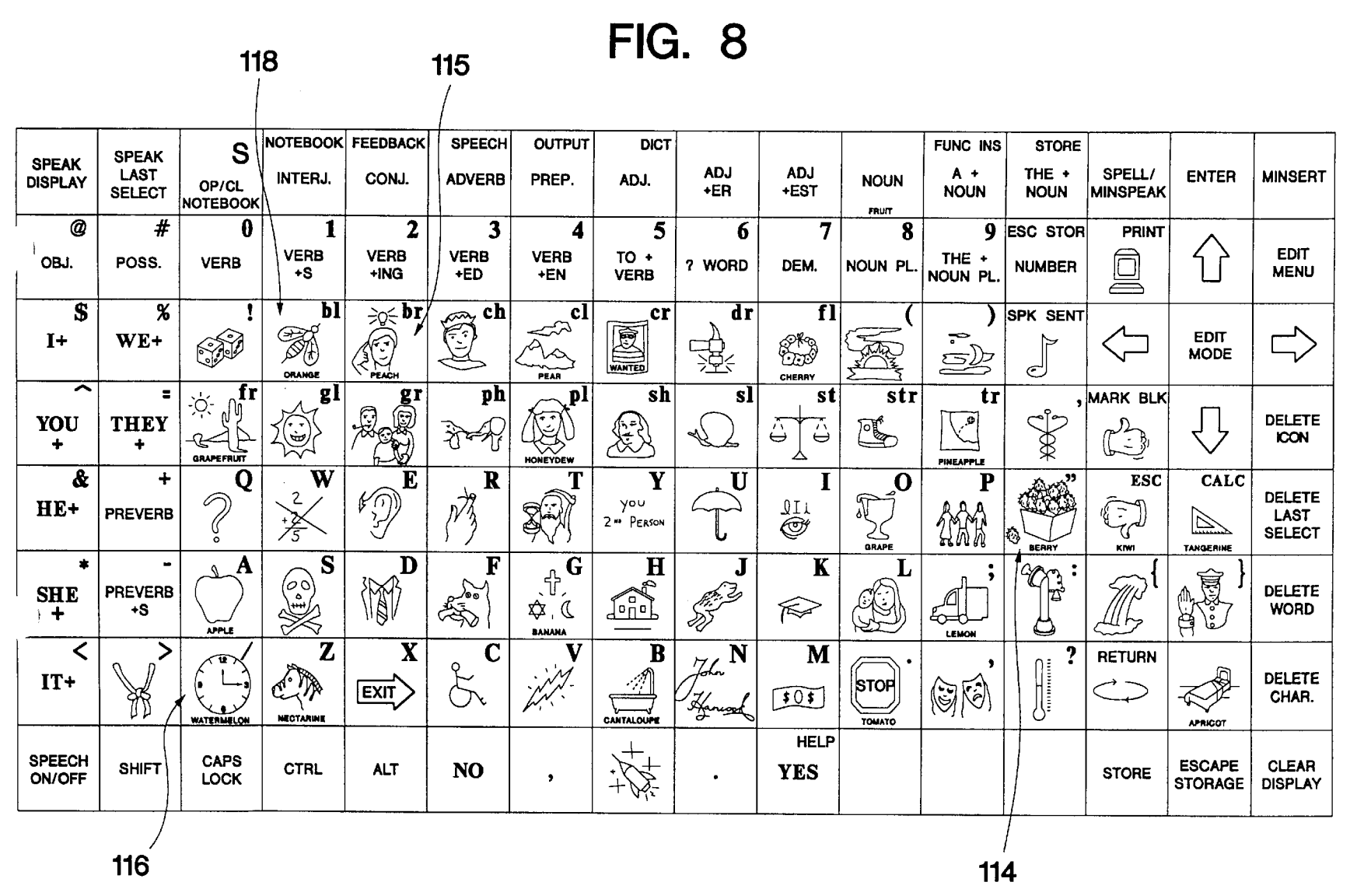

Similarly, the polysemous meaning of the TREASURE CHEST symbol shown in FIG. 5, on the key including the "END" symbol, can be maintained, by embellishing the symbol to be a chest full of berries as shown as key 114 in FIG. 8. By embellishing the TREASURE CHEST symbol, one can easily remember the now polysemous meaning of the chest, corresponding to "bury a treasure chest" and "berry" which is a fruit in its dynamic category.

To further aid the user, the key 115 can be displayed in a peach type color, and the key 114 can be displayed in a red berry-like color. Also, like the dynamic category keys including newly displayed symbols shown in FIG. 6, each of the keys corresponding with embellished symbols of a particular dynamic category can be highlighted in an individual manner by displaying them in colors, while displaying other keys in black and white; by highlighting the border of each of the keys in a manner somewhat similar to that shown by area 70 with regard to FIG. 6 (only concerning individual keys and not a group of keys); or by displaying only the keys of a dynamic category including the embellished symbols, while eliminating the display of other non-embellished symbols, for example. It should be noted that the embellished symbols of the alternative keyboard can be rendered distinct from the original symbols in a variety of ways by varying their color, size, brightness, tone, etc. from that of the original symbols.

Finally, it should be noted with regard to newly displayed symbols of the first embodiment or with regard to embellished symbols of the second embodiment, once a particular message has been accessed and eventually output, the dynamically redefined keys are displayed in their original non-embellished or original symbol form. Thus, the alternative keyboard is removed and the keyboard in its original form as shown in FIG. 2b is displayed. This ensures that the use will have easy access to his core vocabulary.

FIG. 7a is a flowchart generally illustrating the second preferred embodiment of the present application. Initially, in step 72, symbols indicating valid choices are displayed. Similar to step 24 of FIG. 4a, if icon or symbol prediction as described in U.S. Pat. No. 5,297,041 to Kushler et al is utilized, only symbols representing a first positional symbol of a first set, or third set of symbol sequences stored in memory 6, and associated with prestored messages, or of a second set of symbol sequences stored in memory 6 and associated with dynamic categories, are displayed to a user in a manner that makes them distinct from non-valid symbols. On the keyboard 2, keys 3 containing valid symbols can be designated by a lit LED 5 for example. On the displayed touch panel keyboard in the area 7b as shown in FIG. 3, these valid symbols can be highlighted or a boxed area surrounding the symbol can be highlighted, for example, to designate valid symbol choices.

In step 74, a user then selects a key with a corresponding symbol (by any of a number of ways as described previously regarding the first embodiment), and in step 76 the microprocessor 4 determines whether or not the symbol selected is one of the valid symbols. Similar to that previously described with regard to steps 28 and 30 of FIG. 4a, a message is displayed in step 78 if an invalid symbol has been selected. It should be noted that if icon or symbol prediction is not utilized (since symbol or icon prediction is optional), a user initially selects a key with a corresponding symbol in step 74 and then that symbol is compared to a first set of symbol sequences prestored in memory 6 to determine whether or not a match exists.

Upon detection of selection of a key and corresponding valid symbol in step 76, a comparison is then made in step 80 by microprocessor 4, to determine whether or not the selected symbol matches one of the prestored symbol sequences of a first set stored in memory 6. If so, then a message associated with the matched symbol sequence is accessed and output in step 82. This output can be an audible output through a voice synthesizer for example, and/or can be a displayed output displayed in area 7a of FIG. 3 for example. It should further be noted that the prestored symbol sequences of the first set are similar to those mentioned as being part of the first set in the first embodiment. However, several of the prestored symbol sequences include embellished symbols as a last symbol in a sequence, and not new symbols.

If the symbol corresponding to the key selected does not match any of the prestored symbol sequences of the first set stored in memory 6 with an associated message, then in step 84 the microprocessor 4 determines whether or not the symbol completes a dynamic category. That is, the selected corresponding symbol is compared by microprocessor 4 with a second set of prestored symbol sequences, each of these prestored symbol sequences corresponding to a dynamic category. Each of the prestored symbol sequences of the first and second set include at least one symbol and are stored in memory 6. If two or more symbols are included, these symbols are stored in a predetermined sequence. Further, this second set of symbol sequences are stored similar to those previously described in the first embodiment. However, each symbol sequence of the second set in this embodiment, includes a dynamic category with associated embellished symbols.

Each of the prestored symbol sequences of the second set are stored with a corresponding dynamic category in memory 6. Each dynamic category is used to provide access to an alternative keyboard. Further, with each dynamic category, a plurality of keys to be dynamically redefined (preferably less than all of the keys of the original keyboard), their positional (XY) location on the keyboard (hardwired and/or displayed), and the embellishment which is to place are stored in memory 6. Thus, for example, if a key is included in a particular dynamic category, the microprocessor 4 will alter the stored display bitmap in a predetermined manner (stored with the dynamic category) to result in an embellishment of the previously displayed symbol to thereby change the visual keyboard of the integrated input and display device 7 at the XY position of the touch screen of the key. Types of embellishments which can occur and ways to differentiate embellished key symbols from non-embellished key symbols will be discussed later.

If the symbol does not complete a dynamic category, meaning that the symbol has not been determined by microprocessor 4 to match any of the prestored symbol sequences of the second set stored in memory 6, then the system returns to step 72 (if icon prediction is being used) and valid second symbol choices will be displayed to a user.

Subsequently, a user selects a key with a corresponding next symbol in step 74, and this symbol is combined with the previously selected symbol to form a symbol sequence with a first selected symbol corresponding to a first position in the sequence and the second selected symbol corresponding to a second position in the sequence. Once it is determined that another key displaying a valid symbol has been selected in step 76, the system then moves to step 80 wherein this two symbol sequence will be compared by microprocessor 4 to the first set of symbol sequences stored in memory 6 with an associated message. If no match is determined by microprocessor 4 in step 80, then the system moves to step 84 to again determine whether or not this two symbol sequence corresponds to a dynamic category. If the microprocessor 4 determines that this two symbol sequence matches one of a plurality of prestored symbol sequences of the second set stored in memory 6, the microprocessor 4 then determines which symbols of which keys are to be embellished, and how they are to be embellished. Then, in step 86, symbols corresponding to the dynamic category matched in step 84 are embellished. Embellishment of dynamic symbols is explained as follows.

It should initially be noted that this second set of symbol sequences of this second preferred embodiment are different from the second set of symbol sequences discussed previously with regard to the first preferred embodiment. Each of these symbol sequences of the second set, while providing access to a dynamic category and thus providing a user access to a alternative keyboard used to access "fringe" vocabulary words, dynamically redefines keys by embellishing certain display symbols, and not by displaying new symbols replacing the original symbols achieved in the first preferred embodiment of the present application. Accordingly, once a selected symbol sequence matches one of the prestored symbol sequences of the second set, then microprocessor 4 determines the keys designated to correspond to the particular dynamic category associated with the matched symbol sequence, and the symbols corresponding to these keys are then embellished in a predetermined manner as follows.

As shown in FIG. 8 of the present application, if a first key with an APPLE symbol is selected and activated, followed by a second selection and activation of the key with the APPLE symbol, then an APPLE-APPLE symbol sequence is temporarily stored. This APPLE-APPLE sequence matches a prestored dynamic category of the second set as described with regard to the second embodiment of the present application. This particular dynamic category accessed, corresponds to "fruits" for example.

The microprocessor 4 then determines that a plurality of the keys must be dynamically redefined so as to correspond to various entries under the accessed dynamic category "fruits". For example, in the third row as shown in FIG. 8 (from the top of the figure), the keys including the original symbols of the "BEE", the "IDEA", the "MOUNTAINS", and the "WREATH" correspond to keys of this accessed dynamic category; in the fourth row the keys including corresponding original symbols of the "CACTUS", "GIRL", and "MAP" belong to the accessed dynamic category; in the fifth row the keys including corresponding original symbols of the "WINE GLASS", the "TREASURE CHEST", the "THUMBS DOWN", and the "TRIANGLE" belong to the accessed dynamic category; in the sixth row the keys including corresponding original symbols of the "APPLE", "RELIGIOUS SYMBOLS", and "TRUCK" belong to the accessed dynamic category; and in the seventh row the keys including corresponding original symbols of the "CLOCK", "ZEBRA", "BATHTUB", "STOP SIGN", and "BED" correspond to accessed the dynamic category.

Once the microprocessor 4 determines which keys include corresponding symbols of the dynamic category, and how each symbol of each key is to be embellished, then in step 86 the microprocessor 4 controls the display of display area 7b of the integrated input and display device 7 for example, to display embellished symbols specific to the dynamic category. In other words, the previously displayed symbols corresponding to the dynamic category are dynamically redefined.

This embellishment or redefining can include, as shown in FIG. 8 for example, displaying a word corresponding to the specific "fringe" word which can be accessed by selecting that symbol. This word can be indicated below (or above, next to, or within) the symbol as shown by element 118, indicating the word "orange" below the "BEE" symbol of FIG. 8 for example. Additionally, the color of the symbol could be changed to embellish the symbol, such as coloring the "CLOCK" symbol to be green for example as indicated by element 116 of FIG. 8. Still further, the symbol could be embellished by enhancing or altering the preexisting symbol, such as by altering the treasure chest so as to become a chest of berries as shown by element 114 of FIG. 8. Further, certain ones of the symbols can become polysemous based upon their previous meaning and present meaning, as shown by element 115 corresponding to "a peach of an idea" or as shown by element 114 corresponding to both "bury treasure" and "berry" which is a fruit. Each key corresponding to a dynamic category which is to be embellished, and the kind of embellishment which is to occur, is prestored in association with each dynamic category in memory 6.

Upon the symbols being embellished in step 86, the system then returns to step 72, and the user eventually selects what could be an embellished symbol in step 74, to subsequently complete an icon sequence. If a symbol sequence match is determined in step 80, a "fringe" word such as "peach" or "berry" is accessed and the accessed message is subsequently output in step 82 as the "fringe" word for example.

More specifically, as shown in FIG. 7b, the temporarily stored symbol sequence in the icon buffer of memory 6 is initialized to the null sequence in step 88. In essence, the icon buffer of the memory 6 is cleared of all icons or symbols. Next, in step 90, the symbol corresponding to the key activated, either through a key 3 of keyboard 2 or through a key of the integrated input and display device 7, is determined by microprocessor 4. In step 92, the determined symbol is added to the sequence of previously determined symbols temporarily stored in the icon buffer. For example, an APPLE key is initially selected and activated. If so, then this section is detected by microprocessor 4, a symbol (in this case APPLE) is retrieved from memory 6 based upon the key position detected, and the APPLE symbol is stored in the first position of the icon buffer in step 92. The APPLE symbol is then compared by microprocessor 4 with a first set of prestored symbol sequences in memory 6, each with an associated message in step 94.

In step 96, the microprocessor 4 determines whether or not the temporarily stored symbol sequence exactly matches any of the first set of prestored symbol sequences. If not, in step 102, the temporarily stored symbol sequence in the icon buffer is then compared, by microprocessor 4, with the second set of prestored symbol sequences stored in memory 6. This second set of prestored symbol sequences correspond to a plurality of dynamic categories (one for each symbol sequence of the second set) which can be used to form a alternative keyboard to allow a user to access specific fringe words by selection and activation of embellished keys of the particular dynamic category selected.

In step 104, the microprocessor 4 determines whether or not the temporarily stored sequence in the icon buffer exactly matches any of the second set of prestored symbol sequences in memory 6. Since the APPLE key alone (in this example) is not used to access a particular dynamic category, the system returns to step 90 of FIG. 7*b*.

Upon returning to step 90 of FIG. 7*b*, the microprocessor 4 then detects the key position of the selected key activated and the symbol corresponding to the next key activated. In this instance, if the APPLE key is again activated, then the APPLE is also the second symbol, forming an APPLE-APPLE symbol sequence. The APPLE symbol is added to the sequence of previously determined symbols temporarily stored in the icon buffer in step 92. Thus, the APPLE-APPLE sequence stored in the icon buffer includes an APPLE symbol in the first positional location and an APPLE symbol in the second positional location.

Next, in step 94, the temporarily stored symbol sequence of APPLE-APPLE is compared by microprocessor 4 to each of a first set of prestored symbol sequences stored in the memory 6, each with an associated message. In step 96, the microprocessor 4 determines whether or not the APPLE-APPLE sequence exactly matches any of the first set of prestored symbol sequences. Since it does not (in this example), the system then moves on to step 102 wherein the APPLE-APPLE sequence is compared by microprocessor 4 with a second set of prestored symbol sequences stored in memory 6. Each of these prestored symbol sequences correspond to a dynamic category, each of which provide the user with a alternative keyboard to access a plurality of fringe words. Each high level keyboard includes at least one dynamically redefined key.

In step 104 of FIG. 7*c*, the microprocessor 4 determines whether or not the temporarily stored symbol sequence of APPLE-APPLE exactly matches any of the second set of stored symbol sequences corresponding to dynamic categories. In this instance, the APPLE-APPLE symbol sequence exactly matches a prestored APPLE-APPLE sequence corresponding to the dynamic category of "fruits".

In step 106, the dynamic category of "fruits" is determined and in step 108 the microprocessor 4 .determines which of the displayed keys, and their corresponding position, include symbols corresponding to the determined dynamic category. These keys can include a plurality of keys shown in FIG. 8 for example. Next, in step 110, the microprocessor 4 determines how each of the symbols previously displayed, of the keys belonging to the dynamic category, is to be embellished based upon information prestored with the matching prestored symbol sequence of the dynamic category.

For example, a plurality of keys in each of the third, fourth, sixth, and seventh rows of the displayed keyboard shown in FIG. 8 are embellished by adding a word corresponding to a particular fruit to an area on the display key below the particular symbol. For example, the word "orange" is displayed below the "BEE" symbol as designated by element 118 of FIG. 8. Other keys, such as the key including the "CLOCK" symbol labeled 116 in FIG. 8, change color, the CLOCK being embellished to be green, corresponding to a watermelon for example.

Still other of the keys, such as the "TREASURE CHEST" symbol of key 114, are transformed so as to be polysemous between its previous and present form. For example, the key shown as 114 previously included the "TREASURE CHEST" as its symbol, and now includes a chest filled with berries. Thus, a user can associate "buried treasure" with the fruit "berries". Similarly, with regard to key 115, the "IDEA" symbol now becomes the key corresponding to the fruit "peach", conveying the aspect of "peach of an idea" as shown by element 115 of FIG. 8. Thus, after step 110, in step 112, the microprocessor 4 controls the display to embellish previously displayed symbols of all displayed keys of the dynamic category as previously determined.

Thereafter, the system returns to step 90 of FIG. 7*b* wherein a next key is selected and activated, its corresponding symbol is added to the symbol sequence in step 92, the symbol sequence is compared with the first set of prestored symbol sequences in step 94, and the microprocessor 4 determines whether or not the temporarily stored symbol sequence exactly matches any of the first set of stored symbol sequences in step 96. Thus, if the keys corresponding to the APPLE key, the APPLE key again, and the embellished key 114 are sequentially selected and activated, the message "berry" will be accessed in step 98 and the accessed message will be output in step 100.

Similar to the first embodiment of the present application, the flowchart of FIGS. 7*b* and 7*c* can be modified such that, upon selection and activation of an embellished key, a message can be immediately accessed by the microprocessor 4 comparing the symbol corresponding to the embellished key to a third set of single symbols prestored in memory 6, each associated with a message to be output. In other words, from step 112, an embellished key is selected and activated, and if so, then a message can be immediately accessed in step 98 if desired.

Further, embellished keys can also be highlighted so as to illustrate to a user which of the plurality of original symbols have been embellished, to thereby easily distinguish keys of this alternative or dynamic keyboard for a particular dynamic category, from the original keys. This differentiation between original and embellished symbols can be done in any of the ways previously described regarding the first embodiment.

If icon prediction is used as described in U.S. Pat. No. 5,297,041 to Kushler et al, the embellished keys corresponding to the dynamic category can be highlighted to distinguish them from other non-dynamic category keys, and further additional valid keys of particular symbol sequences not involving an embellished key can also be indicated to a user and distinguished from other non-valid keys similar to that explained previously regarding the first embodiment.

Further, if a hardware keyboard 2 is also included, LEDs 5 of keys 3 positionally corresponding to embellished keys can be activated to indicate to a user that certain symbols have been embellished on the integrated input and display unit 7. Thus, a user can select an embellished key by activating a positionally corresponding key 3 on the hardware keyboard 2 in a manner similar to that described with the first embodiment. Also, if additional keys remain valid, i.e. keys corresponding to valid non-embellished symbols, then the corresponding LEDs 5 of the keys 3 on the hardware keyboard 2 can be lit to indicate these valid keys to a user. Also, similar to the first embodiment of the present application, an embellished symbol key can be activated through any of the various input methods previously mentioned including direct access to the touch panel key displayed in a display area 7b or row-column scanning of the displayed or hardware keyboard for example.

Figure 9A:
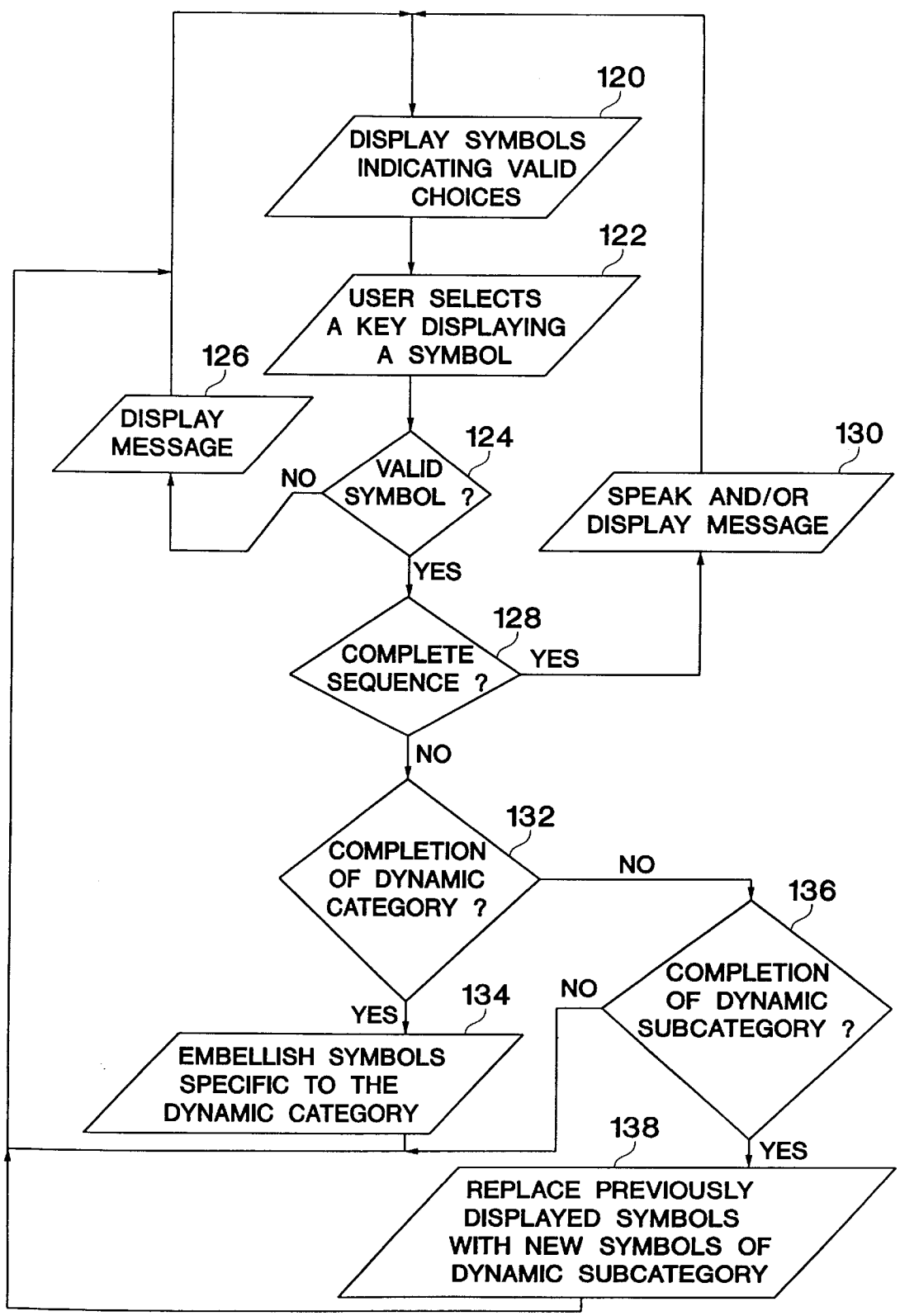
FIG. 9a illustrates a flowchart of a third preferred embodiment of the present application.
Figure 9B:
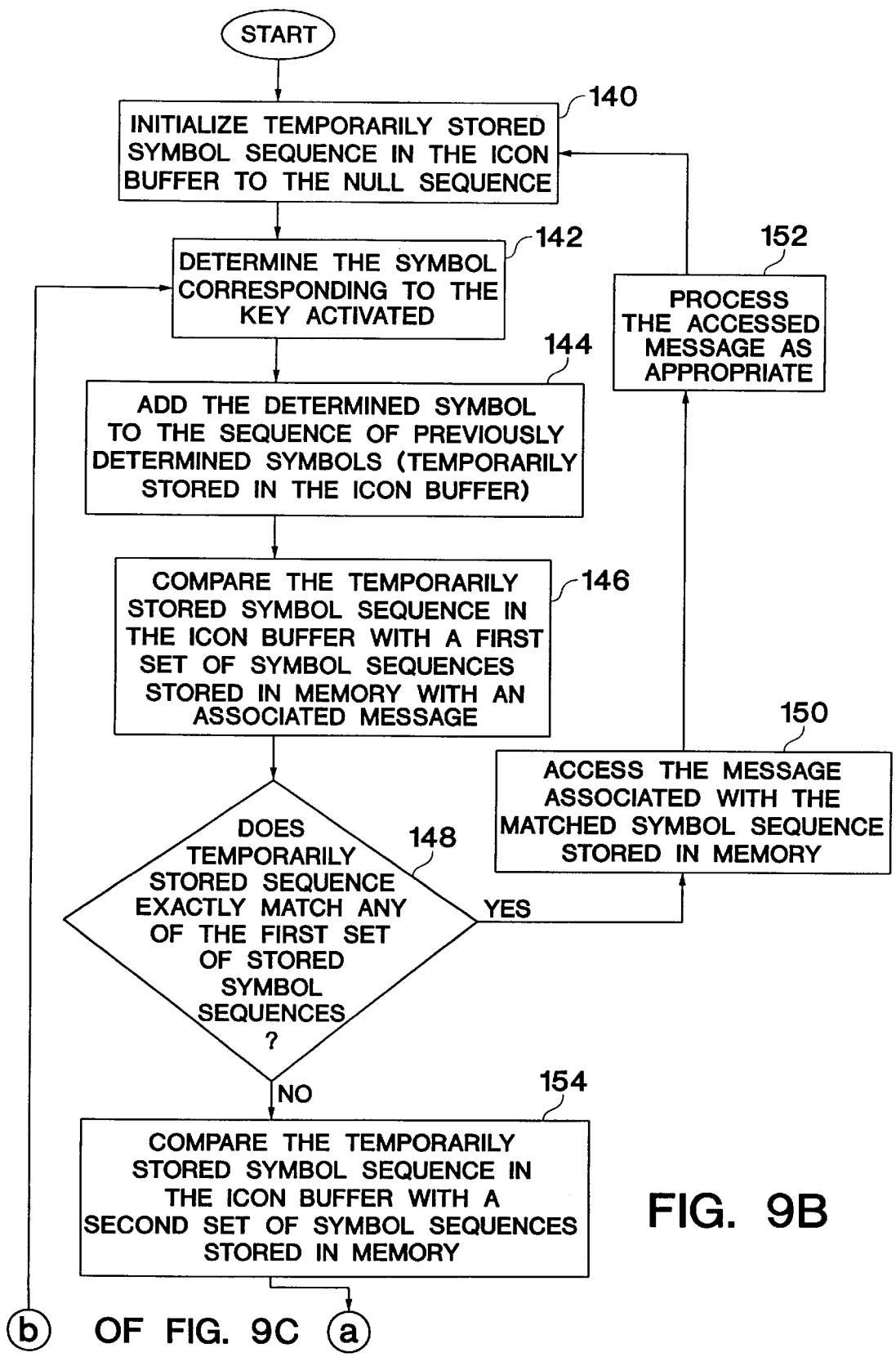

FIGS. 9A–C illustrate a third preferred embodiment of the present application for not only dynamically redefining at least one of a plurality of keys on the display keyboard in response to a selected symbol sequence matching one of a plurality of prestored symbol sequences to thereby dynamically redefine a plurality of keys of the displayed keyboard based upon an accessed dynamic category, but for further again dynamically redefining at least one of a plurality of keys on the displayed keyboard in response to a previously dynamically redefined key (of the dynamic category) being selected. This thereby provides for further dynamically redefining of a plurality of keys of the displayed keyboard based upon an accessed dynamic subcategory.

In this third preferred embodiment, existing symbols are preferably embellished in a manner similar to that previously described with regard to FIGS. 7A–C (or they could alternately be replaced with newly displayed symbols of a particular dynamic category as previously described with regard to FIGS. 4A–C).

However, these embellished symbols, when selected, provide further access to an even alternative keyboard of a dynamic subcategory corresponding to the embellished symbol selected.

As previously stated, existing symbols can be replaced with newly displayed symbols of a particular dynamic category, and these newly displayed symbols can then provide access to a particular dynamic subcategory, if desired. However, FIGS. 9A–C will be described with regard to the preferred embodiment of the present application, wherein existing symbols are initially embellished and upon selection of an embellished symbol, a dynamic subcategory is accessed.

In response to accessing a dynamic subcategory, newly displayed symbols of a particular dynamic subcategory can replace existing symbols; or windows providing lists of words corresponding to the dynamic subcategory for subsequent selection by user can be displayed; or data tables corresponding to the existing dynamic subcategory can be displayed. With regard to the preferred embodiment of the present application, however, FIGS. 9A–C will be described with regard to the aspect that existing symbols are replaced by newly displayed symbols corresponding to a dynamic subcategory, upon detecting selection of a key including a corresponding embellished symbol of a particular dynamic category.

Initially, it should be noted that with regard to embellishing a symbol in this preferred embodiment, the embellishing can be done in any of the forms previously mentioned with regard to the second preferred embodiment of the present application including FIGS. 7A–C. Similarly, with regard to display of newly displayed symbols, these newly displayed symbols can be displayed in a manner similar to that previously described with regard to the first preferred embodiment of the present application including FIGS. 4A–C. Also, embellished symbols corresponding to a dynamic category, and newly displayed symbols corresponding to a dynamic subcategory, can be rendered distinct from other existing symbols in any of the ways previously mentioned corresponding to the first preferred embodiment of the present application including FIGS. 4A–C, or the second preferred embodiment of the present application including FIGS. 7A–C. Also, the keys including corresponding embellished or newly displayed symbols of a dynamic category or dynamic subcategory can be activated in a manner similar to any of the various ways previously described with regard to the first embodiment including FIGS. 4A–C or the second embodiment of the present application including FIGS. 7A–C. Finally, symbol prediction, if optionally used, can be used in the manner similar to that previously described with regard to the first embodiment of the present application including FIGS. 4A–C or the second embodiment of the present application including FIGS. 7A–C.

FIG. 9A is a flow chart generally illustrating the preferred embodiment of the present application. Initially, in step 120, symbols indicating valid choices are displayed. Similar to that previously described with regard to FIG. 4A of the present application, if icon or symbol prediction as described in U.S. Pat. No. 5,297,041 to Kushler et al. is utilized, only symbols representing a first positional symbol of a first set of prestored symbol sequences (as will be described subsequently), or a fourth set of symbol sequences (as will be described subsequently), stored in memory 6 and associated with prestored messages; or a second set of symbol sequences stored in memory 6 and associated with dynamic categories; or a third set of symbol sequences stored in memory and associated with dynamic subcategories, are displayed to a user in a manner that makes them distinct from non-valid symbols. Thus, further description of steps 124 and 126 will be omitted for the sake of brevity, since these steps operate in a manner similar to that previously explained regarding the first and second embodiments of the present application.

In step 122, a user selects a key with a corresponding symbol (by any of a number of ways as described previously with regard to the first or second embodiment of the present application for example), and assuming a valid symbol is detected as being selected, a comparison is then made in step 128 by microprocessor 4 to determine whether or not the selected symbol matches one of the prestored symbol sequences of a first set stored in memory 6. If so, then a message associated with the matched symbol sequences is accessed and output in step 130.

It should be noted that this output can be an audible output through a voice synthesizer for example, and/or can be a displayed output displayed in area 7A of FIG. 3 for example. It should further be noted that the prestored symbol sequences of the first set are similar to those mentioned as being part of the first set in the first and second embodiment, however several of the prestored symbol sequences can include embellished symbols as a last symbol in a sequence (which are normally used to access a particular dynamic subcategory, but which can be used, optionally, to access a prestored message) and/or can include newly displayed symbols as a last symbol in a symbol sequence, these newly displayed symbols corresponding to particular symbols within a dynamic subcategory.

If the symbol corresponding to the key selected does not match any of the prestored symbol sequences of the first set stored in memory 6 with an associated message, then in step 132, the microprocessor determines whether or not the symbol completes a dynamic category. That is, the selected corresponding symbol is compared by microprocessor 4 with a second set of prestored symbol sequences, each of these prestored symbol sequences corresponding to a dynamic category.

Each of the prestored symbol sequences of the first and second set, as well as the third and fourth sets, include at least one symbol and are stored in memory 6. If two or more symbols are included, these symbols are stored in a predetermined sequence. Further, the second set of symbol sequences are stored similar to those previously described in the second embodiment of the present application. However, each symbol sequence of the second set in this embodiment includes a dynamic category with associated embellished symbols. Further, with each dynamic category, key locations of keys belonging to the dynamic category, and the type of embellishment to take place for each such key are stored in memory 6.

If the symbol does not complete a dynamic category, meaning that the symbol has not been determined by the microprocessor 4 to match any of the prestored symbol sequences of the second set stored in memory 6, then in step 136 the microprocessor 4 determines whether or not the symbol completes a dynamic subcategory. That is, the selected corresponding symbol is compared by microprocessor 4 with a third set of prestored symbol sequences, each of these prestored symbol sequences corresponding to a dynamic subcategory. Further, this third set of symbol sequences are stored similar to those previously described with regard to the first and second symbol sequences in the first and second embodiment of the present application. However, each symbol sequence of the third set in this embodiment, includes a dynamic subcategory with associated newly displayed symbols. Further, with each dynamic subcategory, key locations of keys belonging to the dynamic subcategory, and the new symbols to be displayed to take the place of previously displayed symbols for each key are stored in memory 6.

If the symbol does not complete a dynamic subcategory, meaning that the symbol has not been determined by microprocessor 4 to match any of the prestored symbol sequences of the third set stored in memory 6, then the system returns to step 120 (if icon prediction is being used) and valid second symbol choices will be displayed to a user.

Subsequently, a user selects a key with a corresponding valid symbol in step 122, and this symbol is combined with the previously selected symbol to form a symbol sequence with a first selected symbol corresponding to a first position in the sequence and the second selected symbol corresponding to a second position in the sequence. Once it is determined that another key displaying a valid symbol has been selected in step 124, the system then moves to step 128 wherein the two-symbol sequence will be compared by microprocessor 4 to the first set of symbol sequences stored in memory 6 with an associated message. If no match is determined by microprocessor 4 in step 128, then the system moves to step 132 to determine whether or not this two-symbol sequence corresponds to a dynamic category.

If the microprocessor 4 determines that this two-symbol sequence matches one of the plurality of prestored symbol sequences of the second set stored in memory 6, the microprocessor 4 then determines which keys include symbols to be embellished, their positional location, and how they are to be embellished. The aforementioned information is stored in memory 6, along with the matching symbol sequence of the second set. Then, in step 134, symbols corresponding to the dynamic category matched in step 132 are embellished. Embellishment of dynamic symbols occurs in the same manner as previously described with regard to the second embodiment of the present application.

Once the microprocessor 4 determines which keys include corresponding symbols of the dynamic-category, and how each symbol of each key forming the dynamic keyboard of this particular dynamic category is to be embellished, then step 134 the microprocessor controls the display of the display area 7B of the integrated input and display device for example, to display embellished symbols specific to the dynamic category accessed. In order words, the previously displayed symbols corresponding to the dynamic category are dynamically redefined.

Somewhat similar to that previously described with regard to the second embodiment of the present application, this embellishment or redefining can include, as shown in FIG. 8, displaying something which can be accessed by selecting the embellished symbol. However, instead of displaying a word corresponding to the specific "fringe" word which could be accessed by selecting the embellished symbol in the second embodiment of the present application, the word displayed can be that of a particular dynamic subcategory as will be explained hereinafter.

Again, similar to the second embodiment of the present application, this word can be indicated below, above, next to, or within this symbol as shown by element 118 of FIG. 8, indicating the word "orange" below the "BEE" symbol for example. Other methods of embellishing can include methods similar to those previously described with regard to the second embodiment of the present application, but instead of corresponding to individual fringe words of particular dynamic category, the embellishing corresponds to actual dynamic subcategories which can be accessed by selecting a key corresponding to a particular embellished symbol. Each key corresponding to a dynamic category which is to be embellished, its positional location, and the kind of embellishment which is to occur, is prestored in association with each dynamic category in memory 6.

Upon the symbols being embellished in step 134, the system then returns to step 120, and the user eventually selects what could be an embellished symbol in step 74, to subsequently complete an icon sequence. If the symbol sequence match is determined in step 128, a "fringe" word can be accessed, in a manner similar to that previously described with regard to the second embodiment of the present application, and the accessed message is subsequently output in step 130 as the "fringe" word for example.

However, the embellished symbol selected preferably does not complete a symbol sequence matching one of the first set of prestored symbol sequences in step 128. Therefore, the system moves to step 132, and upon the microprocessor 4 determining that the symbol sequence does not match any of the prestored symbol sequences of the second set stored in memory, in step 132, then in step 136, the microprocessor 4 determines whether or not the symbol completes a dynamic subcategory. That is, the selected corresponding symbol and the symbol sequence is compared by microprocessor 4 with a third set of prestored symbol sequences, each of these prestored symbol sequences corresponding to a dynamic subcategory.

Each of the prestored symbol sequences of this third set similarly include at least one symbol and are stored in memory 6. If two or more symbols are included, these symbols are stored in a predetermined sequence. Further, this third set of symbol sequences are stored similar to those previously described with regard to the first and second embodiments of the present application. However, each symbol sequence of the third set in this third preferred embodiment of the present application, includes a dynamic subcategory with associated newly displayed symbols, keys included within the dynamic category, and their positions.

Upon accessing a particular dynamic subcategory in step 136, then in step 138 previously displayed symbols are replaced with new symbols corresponding to the dynamic subcategory. Stored along with each of the symbol sequences of the third set, is an indication of which keys include symbols which are to be replaced by newly displayed symbols of the dynamic subcategory, as well as the positional location of those keys.

Upon replacing the previously displayed symbols with new symbols of the dynamic subcategory in step 138, the system then returns to step 120, and a key with a corresponding newly displayed symbol is then selected in step 122. This symbol is combined with the previously selected symbols to form a symbol sequence. The system then preferably, if the selected symbol is valid, moves to step 128 wherein microprocessor 4 determines whether or not the symbol sequence, which preferably includes a newly displayed symbol of the dynamic subcategory as a last positional symbol in the sequence, matches any one of the first set of prestored symbol sequences in step 128. If so, then the message associated with the prestored symbol sequence of the first set is output in step 130 as previously described.

Similar to the first embodiment of the present application, the flow charts of FIGS. 9A–C can be modified such that, after symbols are embellished in step 134, it is determined whether or not an embellished symbol is detected. If an embellished symbol is detected, then a dynamic subcategory can be immediately accessed by microprocessor 4 comparing the embellished symbol, corresponding to the detected selected key, to a fourth set of single symbol sequences prestored in memory 6, each associated with a particular dynamic subcategory. In other words, from step 134, an embellished key can be selected and activated, microprocessor 4 can make a comparison to a fourth set of single symbols prestored in memory 6, and upon finding a match, can immediately access a dynamic subcategory in step 136 and thereafter replace previously displayed symbols with new symbols of the dynamic subcategory in step 138. Thus, along with these single symbol sequences of a fourth set stored in memory 6, keys corresponding to the particular dynamic subcategory are also stored, along with the positional location of each of these keys, and along with the newly displayed symbols to be displayed in place of the original symbols.

Further, similar to that previously described with regard to the first and second embodiments of the present application, the flow charts of FIGS. 9A–C can be modified, in addition to or separate from the modification previously described with regard to embellishing keys, such that upon selection and activation of a newly displayed symbol, a message can be immediately accessed by microprocessor 4 comparing the symbol corresponding to the embellished key to a fourth set, or fifth (next) set of symbol sequences prestored in memory 6, each of the symbol sequences of this fourth or fifth (next) set including only a single symbol and each associated with a message to be output. In other words, from step 138, it can be determined whether or not a key corresponding to a newly displayed symbol is selected and activated, and if so, then a message can be immediately accessed and output in step 130.

Still further, the flow chart of FIGS. 9A–C can alternatively be modified such that, upon selection and activation of an embellished key, a window displaying selectable words of particular dynamic subcategory, or a data table displaying selectable words of a dynamic subcategory, can be immediately accessed by microprocessor 4 comparing the symbol corresponding to the embellished key to a third set of single symbols prestored in memory. Thus, in place of at least some of the keys of the dynamic keyboard, upon selecting a particular embellished key of a particular dynamic subcategory, a list in the form of a window or table, of particular words corresponding to the dynamic subcategory, could be displayed to a user. Thereafter, by any of a number of ways, a user could select one of the displayed words or messages in the window or data table for example, for subsequent access and output in step 130 for example. This allows for all the members of the dynamic subcategory to be immediately displayed in the form of words or messages in the data table or window, instead of in the form of newly displayed symbols on keys of the keyboard.

An example of the operation of this third preferred embodiment, utilizing symbols of an exemplary symbol sequence, will be described with regard to FIGS. 9B and C of the present application. As shown in FIG. 9B, the temporarily stored symbol sequence in the icon buffer of memory 6 is initialized to the null sequence in step 140. In essence, the icon buffer of the memory 6 is cleared of all icons or symbols. Next, in step 142, the symbol corresponding to the key activated is determined by microprocessor 4. In step 144, the determined symbol is added to the sequence of previously determined symbols temporarily stored in the icon buffer.

For example, an APPLE key is initially selected and activated. If so, then this selection is detected by microprocessor 4, a symbol (in this case APPLE) is retrieved from memory 6 based upon the key position detected, and the APPLE symbol is stored in the first position of the icon buffer in step 144. The APPLE symbol is then compared in step 146 by microprocessor 4 to the first set of prestored symbol sequences in memory 6, each stored with an associated message.

In step 148, the microprocessor 4 determines whether or not the temporarily stored symbol sequence exactly matches any of the first set of prestored symbol sequences. If not, in step 154, the temporarily stored symbol sequence in the icon buffer is then compared, by microprocessor 4, with a second set of prestored symbol sequences stored in memory 6. This second set of prestored symbol sequences correspond to a plurality of dynamic categories (one for each symbol sequence of the second set) which can be used to form a alternative keyboard to allow a user to access any one of a plurality of dynamic subcategories (displayed in the form of a data table, window, or an even alternative keyboard of newly displayed symbols) by subsequent selection and activation of embellished keys of a particular dynamic category selected.

In step 156, the microprocessor 4 determines whether or not the temporarily stored symbol sequence in the icon buffer exactly matches any of the second set of prestored symbol sequences in memory 6. Since the APPLE symbol alone, (in this example) is not used to access a particular dynamic category, the system then proceeds to step 166.

In step 166, the microprocessor 4 determines whether or not the temporarily stored symbol sequence exactly matches any of the third set of prestored symbol sequences stored in memory 6. This third set of prestored symbol sequences correspond to a plurality of dynamic subcategories (one for each symbol sequence of the third set) which can be used to form an even alternative keyboard to allow a user to access specific fringe words (for example) by selection and activation of keys including newly displayed symbols of a particular dynamic subcategory selected. Since the APPLE symbol alone (in this example) is not used to access a particular dynamic subcategory, the system returns to step 142 of FIG. 9B.

Upon returning to step 142, the microprocessor 4 then detects the key position of the selected key activated and the symbol corresponding to the selected key activated. In this instance, if the APPLE key is again activated, then the APPLE symbol is also the second symbol, forming an APPLE-APPLE symbol sequence. The APPLE symbol is added to the sequence of previously determined symbols temporarily stored in the icon buffer in step 144. Thus, the APPLE-APPLE sequence stored in the icon buffer includes an APPLE in the first positional location and an APPLE symbol in the second positional location.

Next, in step 146, the temporarily stored symbol sequence of APPLE-APPLE is compared by microprocessor 4 to each of a first set of prestored symbol sequences stored in memory 6, each with an associated message. In step 148, the microprocessor 4 determines whether or not the APPLE-APPLE sequence exactly matches any of the first set of free stored symbol sequences. Since it does not, (in this example), the system then moves on to step 154 wherein the APPLE-APPLE sequence is compared by microprocessor 4 with the second set of prestored symbol sequences stored in memory 6. Each of these prestored symbol sequences correspond to a dynamic category, each of which provide the user with a alternative keyboard to access a plurality of dynamic subcategories. Each high level keyboard includes at least one dynamically redefined key.

In step 156, of FIG. 9C, the microprocessor 4 determines whether or not the temporarily stored symbol sequence of APPLE-APPLE exactly matches any of the second set of stored symbol sequences corresponding to dynamic categories. In this instance, the APPLE-APPLE symbol sequence exactly matches a prestored APPLE-APPLE sequence corresponding to the dynamic category of "fruits".

In step 158, the dynamic category of "fruits" is determined and in step 160 the microprocessor 4 determines which of the displayed keys, and their corresponding position, include symbols corresponding to the determined dynamic category. These keys can include a plurality of keys somewhat similar to those shown in FIG. 8 of the present application, except each of the embellished keys will correspond to a dynamic subcategory, and not to a particular fringe word. For example, the treasure map key in the fourth row from the top on FIG. 8 can be embellished by including the word "tropical" or the words "tropical fruits" underneath the symbol, and can further be embellished s:o that the symbol includes an island with a palm tree and/or pineapple for example. This embellished symbol will now correspond to the subcategory of "tropical fruits".

Next, in step 162, the microprocessor 4 determines how each of the symbols previously displayed, of the keys belonging to the dynamic category, is to be embellished, based upon information prestored with a matching prestored symbol sequence of the dynamic category in memory 6. In this case, the treasure map will be embellished to include a tropical island and to possibly include the words "tropical" or "tropical fruits". Thus, after step 162, in step 164, the microprocessor 4 controls the display to embellish the previously displayed symbols of all displayed keys of the dynamic category as previously determined. This provides the user with a dynamically redefined keyboard providing access to a plurality of subcategories, such as the subcategory "tropical fruits" of the category "fruits". Thereafter, the system returns to step 142.

Upon returning to step 142 of FIG. 9B, the microprocessor then detects the key position of the selected key activated and the symbol corresponding to the selected key activated. In this instance, if the ISLAND key is activated, then the ISLAND is the third symbol, forming an APPLE-APPLE-ISLAND symbol sequence. The ISLAND symbol is added to the sequence of previously determined symbols temporarily stored in the icon buffer in step 144. Thus, the APPLE-APPLE-ISLAND sequence stored in the icon buffer includes an APPLE symbol in the first positional location, an APPLE symbol in the second positional location, and an ISLAND symbol in the third positional location.

Next, in step 146, the temporarily stored symbol sequence of APPLE-APPLE-ISLAND is compared by microprocessor 4 to each of a first set of prestored symbol sequences stored in memory 6, each with an associated message. In step 148, the microprocessor 4 determines whether or not the APPLE-APPLE-ISLAND sequence exactly matches any of the first set of prestored symbol sequences. Since it does not (in this example), the system then moves on to step 154 wherein the APPLE-APPLE-ISLAND sequence is compared by microprocessor 4 with a second set of prestored symbol sequences stored in memory 6. Each of these prestored symbol sequences corresponds to a dynamic category. In step 156 of FIG. 9C, the microprocessor 4 determines whether or not the temporarily stored symbol sequence of APPLE-APPLE-ISLAND exactly matches any of the second set of stored symbol sequences corresponding to dynamic categories.

Since it does not (in this example), the system then moves to step 166 wherein the APPLE-APPLE-ISLAND sequence is compared by microprocessor 4 with a third set of prestored symbol sequences stored in memory 6. Each of these prestored symbol sequences corresponds to a dynamic subcategory, each of which provide the user with an even alternative keyboard which can be used to access a plurality of fringe words. Each alternative keyboard includes at least one dynamically redefined key.

In step 168 of FIG. 7C, the microprocessor 4 determines whether or not the temporarily stored symbol sequence of APPLE-APPLE-ISLAND exactly matches any of the third set of stored symbol sequences corresponding to dynamic subcategories. In this instance, the APPLE-APPLE-ISLAND symbol sequence exactly matches a prestored APPLE-APPLE-ISLAND sequence corresponding to the dynamic subcategory of "tropical fruits".

In step 168, the dynamic subcategory of "tropical fruits" is determined and in step 170 the microprocessor 4 determines which of the displayed keys, and their corresponding position, includes symbols corresponding to the determined dynamic subcategory. The displayed keys belonging to the dynamic subcategory, their corresponding position, and the newly displayed symbols of the dynamic subcategory, which will replace the previously displayed symbols are all stored in association with the prestored symbol sequence of the third set corresponding to APPLE-APPLE-ISLAND in memory 6. These keys can include a plurality of keys somewhat similar to those shown in FIG. 8, for example, except the keys can include names of "tropical fruits" underneath each of the symbols, and the symbols displayed can actually be newly displayed symbols corresponding to a pineapple, a coconut, a kiwi, etc. Thus, in step 174, previously displayed symbols are replaced with new symbols of the dynamic subcategory on all display keys determined to belong to the dynamic subcategory. It should be further noted that these newly displayed symbols can be distinguished or rendered distinct from other symbols on the display in any of the ways previously described with regard to the first embodiment of the present application, or with regard to rendering embellished keys distinct in the second embodiment of the present application.

Thereafter, the system returns to step 142 of FIG. 9B wherein the next key (preferably, but not necessarily corresponding to a newly displayed symbol) is added to the symbol sequence in step 144. The symbol sequence is compared by microprocessor 4 with the first set of prestored symbol sequences in step 146. The microprocessor 4 determines whether or not the temporarily stored symbol sequence exactly matches any of the first set of stored symbol sequences in step 148, and if so, a prestored message associated with the matched symbol sequence is accessed in step 150 and processed in step 152. Thus, if the keys corresponding to the APPLE key, the APPLE key again, the embellished ISLAND key, and a KIWI (for example) key are sequentially selected and activated, the messsage "KIWI" will be accessed in step 150 and the accessed message will be output in step 152.

It should be noted with regard to any of the first, second and third embodiments of the present application, upon completion of the step in which an accessed message is processed, the temporarily stored symbol sequence in the icon buffer is initialized to the null sequence, and all keys are made to display their original symbols as shown in FIG. 2*b* of the present application. Therefore, all embellished symbols and newly displayed symbols are returned to their original displayed form as shown in FIG. 2B upon completion of processing the accessed message in any of steps of 54 of FIG. 4*b*, 100 of FIG. 7*b*, and 152 of FIG. 9*b*.

In addition, with regard to each of the first, second and third embodiments of the present application, it should be readily apparent to one of ordinary skill in the art that the dynamic redefining of at least one of a plurality of keys on the keyboard can take place in the course of a user actually selecting an entire symbol sequence which will match one of the plurality of prestored symbol sequences in order to access an associated message. For example, a user may select the THUMBS UP key, either through an integrated input and display device 7 or through activation of a THUMBS UP key 3 on the keyboard 2, the THUMBS UP key being the key including the notation "mark blk" as shown in FIG. 2B for example. This key can act to input a one symbol sequence (THUMBS UP) to access a particular dynamic category involving embellishing of certain keys. For example, the FINGER key, including the letter "RI" as shown in FIG. 2B for example, and the TRIANGLE key, including the notation "calc" as shown in FIG. 2B for example, can be embellished in response to selection of the THUMBS UP key as will be explained as follows.

Selection of the THUMBS UP key alone does not constitute a symbol sequence matching any of the first set of stored symbol sequences in step 96 of FIG. 7B. However, the symbol sequence of the THUMBS UP key, stored in the icon buffer, is compared with a second set of symbol sequences in step 102 of FIG. 7B for example. It is then determined in step 104 of FIG. 7*c* for example, that the symbol sequence of the THUMBS UP key exactly matches one of the second set of stored symbol sequences. In step 106, the dynamic category associated with the matched symbol sequence of the second set is determined; which of the displayed keys includes symbols corresponding to the determined dynamic category is determined in step 108; how each of the symbols, of the keys determined to belong to this dynamic category, is to be embellished is determined in step 110; and the previously displayed symbols of all displayed keys of the dynamic category are embellished in step 112.

Thus, this single THUMBS UP symbol as shown in FIG. 2B of the present application for example, accesses a dynamic category which leads to the embellishment of the FINGER key and the TRIANGLE key for example. Such an example may include a display of the word "touch" underneath the FINGER symbol and "protrude" underneath the TRIANGLE symbol. In addition, or in the alternative, the FINGER symbol might be embellished to represent a finger "touching" something, and the TRIANGLE symbol may be embellished so as to appear that it is "protruding" in some manner.

Next, when referring to FIG. 7C for example, once symbols of a particular dynamic category are embellished in step 112, the process precedes back to step 90 to determine the symbol corresponding to the next key activated. If such a next key activated is the embellished FINGER key or the embellished TRIANGLE key, when added to the symbol sequence of the THUMBS UP key to form a THUMBS UP—embellished FINGER symbol sequence, or to form a THUMBS UP—embellished TRIANGLE symbol sequence, this two symbol sequence may not exactly match any of the first set of stored symbol sequences stored along with an associated message, when compared in step 94 and determined in step 96. If not, the process precedes to steps 102 and 104, and if it is determined in step 104 that this two symbol sequence does not exactly match any of the second set of stored symbol sequences, then the process again returns to step 90.

Thereafter, in step 90 the symbol corresponding to the next key activated is determined. This key, for example, could correspond to the VERB+ING key, including the number "2" as shown in FIG. 2B. Thereafter, in step 92, such a symbol would be added to the sequence of previously determined symbols to thereby form a THUMBS UP—embellished FINGER—VERB+ING symbol sequence or a THUMBS UP—embellished TRIANGLE—VERB+ING symbol sequence. Then, upon comparison of this stored symbol sequence with a first set of symbol sequences stored in memory with an associated message in step 94, it could be determined in step 96 that such a symbol sequence matches one of the first set of stored symbol sequences.

In this particular instance, if the symbol sequence is THUMBS UP—embellished FINGER—VERB+ING then the message "touching" will be accessed in step 98 and processed in step 100. If the symbol sequence includes the THUMBS UP—embellished TRIANGLE—VERB+ING symbol sequence, then the message "protruding" will be accessed in step 98 and processed in step 100.

Therefore, it should be clear to those of ordinary skill in the art that dynamic redefining of a plurality of keys of the keyboard can occur during the course of input of a predetermined symbol sequence, and does not necessarily have to occur prior to activation of the last key in a symbol sequence. It should further be readily apparent to those of ordinary skill in the art that while the aforementioned example has been given with regard to keys dynamically redefined by embellishment of the symbols on the keys, it is equally applicable to dynamically redefining symbols of keys by displaying new symbols corresponding to an accessed dynamic category on all keys determined to belong to the dynamic category, as shown in FIGS. 4B and C for example; and is also equally applicable to a system combining dynamic redefining of keys utilizing new symbols and embellished symbols as described in FIGS. 9B and C of the present application.

Further, with regard to any of the first, second and third embodiments of the present application, the method of the present application may be implemented on a general purpose computer, a laptop computer, or any type of computer apparatus including a microprocessor 4, memory 6, keyboard 2 and display unit 7 such as those shown in FIG. 1, wherein the display unit 7 is merely a display device and is not an integrated input and display device.

Further, it should be clear to those of ordinary skill in the art that in such an implementation, the methods of the first, second, and third embodiments as illustrated by their corresponding flowcharts, can be stored as a computer program on an article of manufacture such as a computer disk, for example. This computer disk can then operate in conjunction with the hardware of the computer apparatus described above as will be explained subsequently.

If such a display device 7 is used, the display device may include a separate message area 7a and keyboard area 7b. If such a separate display area 7b is used to display symbols corresponding to keys on the keyboard in the manner previously described with regard to any of the first, second and third embodiments of the present application, each key 20 displayed in display area 7b will be displayed with a corresponding symbol 22. Upon dynamically redefining certain keys 3 of the keyboard 2, keys 20 on the displayed keyboard can be designated as being dynamically redefined, such as keys grouped together in the 3×3 square box 18 of FIG. 3 for example, in any of the ways previously described, such as by highlighting the group of dynamically redefined keys 20 or highlighting individual keys 20. Since the display device is not an integrated input and display device, however, keys 3 on the keyboard 2 will only be activatable through the keyboard 2 and not through the keys displayed in the area 7b. Thus, in such an apparatus, the keyboard 2, including the plurality of keys 3 with corresponding symbols thereon, are used for inputting a corresponding symbol upon selection and activation of a key 3.

The apparatus further includes a memory 6 for temporarily storing a symbol sequence including the corresponding symbol of each selected key 3. The memory 6 further stores symbols corresponding to each key 3, symbol sequences for accessing messages stored therewith and symbol sequences for accessing dynamic categories and symbols corresponding thereto, in a manner similar to that previously described with regard to the first, second and third embodiments of the present application.

In such an apparatus, a microprocessor 4 compares the temporarily stored symbol sequence in memory 3, in response to each selection and activation of a key 3, to a plurality of prestored symbol sequences, each including at least one symbol in a predetermined sequence as previously described with regard to the first, second and third embodiments. Finally, a display 7, in response to the temporarily stored symbol sequence matching at least one of the plurality of prestored symbol sequences, displays a plurality of new symbols or a plurality of symbols which are embellished versions of symbols on each of the keys 3. Further, in response thereto the microprocessor 4 dynamically redefines a plurality of keys on the keyboard to correspond to the displayed new or embellished symbols, instead of the symbols displayed on the keys 3 of the keyboard 2.

If new symbols are displayed, in a manner similar to that previously described with regard to the first and third embodiments of the present application for example, these symbols are different from symbols actually shown on each of the keys 3 of the keyboard 2. The new symbols or embellished symbols can be displayed in any of the ways previously described with regard to any of the first, second and third embodiments of the present application, and the embellished symbols can be embellished in any of the ways previously described with regard to the second and third embodiments of the present application.

Display of new or embellished symbols on the display 7 can be in an area 18 of a separate display area 7b, separate from a message display area 7a on the display 7. The newly displayed or embellished symbols can be differentiated from existing displayed symbols in any of the ways previously described with regard to the first, second or third embodiments of the present application.

In the alternative, the display 7 can include a single display area, and not a separate message area 7a and displayed key area 7b. Such a display 7 can display message text in a word processing environment, such as that displayed on a standard computer utilizing standard word processing programs. Then, upon microprocessor 4 comparing a temporarily stored symbol sequence of sequentially activated and selected keys 3 of a keyboard 2, to a plurality of prestored symbol sequences, each including at least one symbol in a predetermined sequence, the display 7 can display new symbols or embellished symbols in response to the temporarily stored symbol sequence matching at least one of the plurality of prestored symbol sequences, in an area separate from or in place of the text on the display 7. Thus, microprocessor 4 can dynamically redefine a plurality of keys 3 on the keyboard 2 to correspond to the newly displayed symbols in display area 7 in response to such a symbol sequence match, such that text is normally displayed on the display area 7 and these new or embellished symbols are only displayed in response to the accessing of a particular dynamic category as previously described with regard to any of the first, second and third embodiments of the present application. An example will be given with regard to the example previously utilized in the first embodiment of the present application.

Through normal selection and activation of keys 3 on the keyboard 2, when temporarily stored symbol sequences exactly match any of the first set of stored symbol sequences as determined in step 50, a particular message, such as a word, phoneme, or plural word message for example, associated with the matched symbol sequence stored in memory is then accessed in step 52 and processed in step 54. These words, for example, are sequentially output and displayed in display area 7 in a manner similar to a user utilizing an alphanumeric keyboard, who inputs text and displays the text in the form of words, sentences and paragraphs.

Then, upon determining in step 58 that the symbol sequences exactly matches any of the second set of stored symbol sequences, a dynamic category associated with the matched symbol sequence of the second set stored in memory 6 will be determined in step 60; keys 3 of the keyboard 2 which include symbols corresponding to the determined dynamic category will be determined in step 62; and new symbols of the dynamic category will be displayed on the display area 7 in step 64. These new symbols can be highlighted or enlarged when compared to the symbols on the keys 3 of the keyboard 2, and can be displayed in a separate area of display area 7 or can be displayed in place of text previously displayed on the display area 7.

Thus, if a user has input the ZEBRA and FATHER TIME keys, then a display of twelve dinosaurs such as those indicated by element 70 in FIG. 6 will be displayed on display 7. These dinosaurs may or may not be displayed with words identifying the dinosaur depicted, and may be displayed in place of text (or a portion of the text) previously displayed on display area 7, wherein the previously displayed text is merely maintained in a temporary memory portion of memory 6, and is redisplayed after selection of a particular one of the newly displayed symbols. In such an aspect of thee present application, additional symbols of the keyboard shown in FIG. 6 will not be displayed on display 7.

One of the aforementioned newly displayed symbols shown in area 70 of FIG. 6 can then be selected upon a user activating a key 3 on the keyboard 2 which has been dynamically redefined so as to correspond to the newly displayed symbol. To indicate correspondence between a displayed symbol and a key 3 on keyboard 2 which has been dynamically redefined, indicators such as light elements 5 on dynamically redefined keys can be activated for example. Thus, if twelve dinosaur symbols are displayed on display area 7, then twelve indicators 5 on twelve keys 3 can be lit or activated.

These twelve dynamically redefined keys 3 can be a group of twelve keys 3, adjacent to one another in a manner similar to the twelve dinosaur keys sown in FIG. 6 of the present application. Thus, upon a user selecting and activating a key positionally corresponding to the newly displayed symbol, the newly displayed symbol of the dynamically redefined key can then be used to access a particular fringe word for example, or can be used in any of the ways previously described with regard to the first, second and third embodiments of the present application.

It should be understood, however, that the keys 3 of the keyboard 2, with activated indicators 5, need not be adjacent keys. Instead, the keys 3 can be separated by one or more keys 3 on the keyboard 2, in any manner which will still indicate to a use which of the keys 3 relatively positionally corresponds to the newly displayed symbols. For example, a user merely has to know that selection and activation of the left most and bottom most key 3 including an activated indicator 5, will access the triceratops symbol as shown in element 70 of FIG. 6. It should be understood that additional ways of indicating which of the keys 3 of the keyboard 2 corresponds to dynamically redefined keys on display area 7 can be used, as would be understood by one of ordinary-skill in the art.

In the alternative, it should be understood that if a split screen display 7, including a message display area 7a and a keyboard display area 7b, is used the entire keyboard can be displayed in the area 7b until such time that a particular dynamic category has been accessed. Upon access or determining of a particular dynamic category, the symbols corresponding to keys which have not been dynamically redefined, in any of the first, second or third embodiments of the present application, can be deleted. Thus, the only symbols displayed in display area 7b are new or embellished symbols corresponding to the particular dynamic category. Thereafter, upon a user selecting and activating a relatively positionally corresponding key 3 on the keyboard 2, relatively positionally corresponding to the new or embellished symbol displayed in display area 7b, a new or embellished symbol corresponding to the dynamically redefined key can then be accessed and used to access a fringe vocabulary words, or can be used in any of the ways previously described with regard to any of the first, second and third embodiments of the present application. Thus, as long as a user can determine that display 7 in some way displays symbols relatively positionally corresponding to at least some of the keys on a keyboard, corresponding indicators 5 on keys 3 need not be used.

It should be understood that if the non-split screen display 7 is used, including only one display area instead of separate display area 7a and 7b for example, the microprocessor 4 can operate in any of the ways similar to that previously described with regard to the first, second or third embodiments of the present application, with selection and access of a particular symbol only occurring through activation of a key 3 on the keyboard 2. Accordingly, symbols corresponding to keys 3, which correspond to the symbol displayed on the key 3 or which correspond to a symbol, either embellished or new, of a dynamically redefined key 3, can be made part of a temporarily stored symbol sequence and can be compared to a first set, second set, third set, fourth set, etc. of a plurality of prestored symbol sequences to access an associated prestored message, to dynamically redefine keys of the keyboard, etc. in a manner similar to that previously described with regard to any of the first, second and third embodiments of the present application. Further, newly displayed symbols or embellished symbols can be symbols of a common theme, the common theme designated by the particular dynamic category accessed for example.

Similarly, selection and activation of a key 3 corresponding to a newly displayed or embellished symbol on display 7, which is subsequently added to a symbol sequence to access a prestored message, to further dynamically redefine keys etc., acts to delete the newly displayed or embellished symbols from the display area 7. Thus, if the newly displayed dinosaur symbols shown in area 70 of FIG. 6 are displayed in place of text on display 7, upon selection of a positionally corresponding key 3 for example to thereby access the newly displayed symbol by activation of the dynamically redefined key 3, the dinosaur symbols will be deleted from display 7 and the previously displayed text, for example, will be redisplayed in its original form. If an additional message has been accessed in response to the temporarily stored symbol sequence, including the accessed newly displayed or embellished symbol for example, matching at least one of a plurality of prestored symbol sequences, then the newly accessed message will be added to the text in a sequential manner similar to that used by a user utilizing an alphanumeric keyboard in a word processing context. Optionally, or additionally, the accessed message can be output for voice synthesization in the same manner previously described with regard to the first, second and third embodiments of the present application.

Additionally, it should be noted with regard to any of the first, second and third embodiments of the present application, that a single display area 7, instead of a split message display area 7a and keyboard area 7b can be utilized. Therefore, even when using an integrated input and display device 7 which includes a touch panel screen which can be used to activate certain keys and access a symbol or dynamically redefined symbol corresponding thereto, text can be displayed in a word processing manner similar to that previously described to a system utilizing a display which is not an integrated input and display device, and dynamically redefined symbols can be displayed in an area separate from the sequentially displayed text information, or in place of previously displayed text information.

If such a single display area is used in an integrated input and display device in any one of the first, second and third embodiments of the present application, it is preferable, although not completely necessary, to display only the symbols of the dynamically redefined keys, which can be newly displayed symbols, embellished symbols, symbols which are enlarged, highlighted, etc., in any of the manners previously described. Such symbols are deleted from display area 7 upon selection and activation of a positionally corresponding 3 on the keyboard 2 or upon selection and activation of one of the displayed keys on the touch screen of the integrated input and display device 7. Thereafter, the accessed message, for example, will be sequentially displayed along with the previously displayed text, which is temporarily stored in memory 6 in a manner similar to that previously described above with regard to the display 7 which is not an integrated input and display device.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

We claim:

1. An apparatus, comprising:
    integrated input and display device for displaying a plurality of keys of a displayed keyboard, each of the plurality of keys including a displayed polysemous symbol defined to correspond thereto, and for inputting a corresponding polysemous symbol upon selection of a key;
    memory for storing a plurality of symbol sequences including the corresponding polysemoous symbol of each selected key, in sequential order of selection; and
    control means for comparing the temporarily stored symbol sequence, in response to each key selection, to a plurality of prestored symbol sequences, each including at least one symbol in a predetemined sequence, and for dynamically redefining symbols of less than all of the plurality of displayed keys of the integrated input and display device in response to the temporarily stored symbol sequence matching at least one of the plurality of prestored symbol sequences.

2. The apparatus of claim 1, wherein the dynamic redefining of the control means includes embellishing display of a corresponding displayed symbol of at least one of the plurality of keys of the displayed keyboard.

3. The apparatus of claim 2, wherein each embellished at least one corresponding displayed symbol relates to a common theme.

4. The apparatus of claim 3, wherein the control means accesses a prestored message associated with an embellished symbol subsequent to a corresponding key being selected.

5. The apparatus of claim 4, further comprising:
    output means for outputting the accessed message.

6. The apparatus of claim 5, wherein the output means includes a voice synthesizer.

7. The apparatus of claim 4, wherein the control means controls the integrated input and display device to display a previously embellished symbol as a non-embellished symbol in response to a corresponding key being selected.

8. The apparatus of claim 4, wherein the memory temporarily stores a new symbol sequence including the previously stored symbols and the embellished symbol, in sequential order of selection, and the control means compares the temporarily stored symbol sequence including the embellished symbol, to the first set of prestored symbol sequences and accesses the prestored message in response to the new symbol sequence including the embellished symbol matching one of the first set of prestored symbol sequences.

9. The apparatus of claim 1, wherein the integrated input and display device is a touch-panel screen.

10. The apparatus of claim 2, wherein at least one embellished corresponding displayed symbol is polysemous.

11. The apparatus of claim 2, wherein the embellishing includes adding a word displayed with a corresponding displayed symbol.

12. The apparatus of claim 2, wherein the embellishing includes modifying a displayed symbol.

13. The apparatus of claim 2, wherein the embellishing includes varying color of a displayed symbol.

14. The apparatus of claim 2, wherein each of the at least one embellished corresponding displayed symbols is displayed on the integrated input and display device so as to render each of the at least one embellished corresponding displayed symbols distinct from non-embellished displayed symbols.

15. The apparatus of claim 14, wherein each embellished symbol is varied in brightness with respect to non-embellished symbols.

16. The apparatus of claim 1, wherein the dynamic redefining of the control means includes replacing at least one corresponding displayed polysemous symbol of at least one key of the displayed keyboard with a newly displayed symbol, different from the previously displayed corresponding polysemous symbol.

17. The apparatus of claim 16, wherein dynamic redefining of the control means includes replacing each of a plurality of corresponding displayed polysemous symbols of a plurality of keys of the displayed keyboard with a newly displayed symbol, each different from the previously displayed corresponding polysemous symbol.

18. The apparatus of claim 17, wherein each of the newly displayed symbols relates to a common theme represented by the temporarily stored symbol sequence previously matched.

19. The apparatus of claim 18, wherein each of the newly displayed symbols are nonpolysemous.

20. The apparatus of claim 18, wherein at least one of the newly displayed symbols replaces the previously displayed polysemous symbol corresponding to a last sequentially detected key.

21. The apparatus of claim 20, wherein each of the newly displayed symbols is proximate to at least one other newly displayed symbol.

22. The apparatus of claim 17, wherein each of the replaced symbols is of a common display tone so as to render each replaced symbols distinct from non-replaced displayed symbols.

23. The apparatus of claim 17, wherein each of the replaced symbols is of a common brightness so as to render each replaced symbol distinct from non-replaced displayed symbols.

24. The apparatus of claim 16, wherein the control means compares the temporarily stored symbol sequence to a first set of a plurality of prestored symbol sequences, each including at least one symbol in a predetermined sequence and an associated prestored message,
  compares the temporarily stored symbol sequence to a second set of a plurality of prestored symbol sequences in response to the temporarily stored symbol sequence failing to match any of the first set of prestored symbol sequences, and
  replaces at least one corresponding displayed polysemous symbol of at least one key of the displayed keyboard with a newly displayed symbol, in response to the temporarily stored symbol sequence matching one of the second set of prestored symbol sequences.

25. The apparatus of claim 16, wherein the control means accesses a prestored message associated with a prestored symbol sequence in response to the temporarily stored symbol sequence matching one of the first set of prestored symbol sequences.

26. The apparatus of claim 25, wherein the control means accesses a prestored message associated with a newly displayed symbol subsequent to a corresponding key being selected.

27. The apparatus of claim 26, wherein each at least one newly displayed symbol is nonpolysemous.

28. The apparatus of claim 26, further comprising:
  output means for outputting at least one of the prestored messages accessed by the control means.

29. The apparatus of claim 28, wherein the output means includes a voice synthesizer and the message output by the output means is voice synthesized.

30. The apparatus of claim 25, further comprising:
  output means for outputting the accessed message.

31. The apparatus of claim 30, wherein the output means includes a voice synthesizer and the message output by the output means is voice synthesized.

32. The apparatus of claim 25, wherein a key of the displayed keyboard of the integrated input and display device is selectable through physical contact with a key of the displayed keyboard.

33. The apparatus of claim 25, further comprising:
  a keyboard, separate from the integrated input and display device, for rendering a key of the displayed keyboard of the integrated input and display device selectable through activation of a key on the separate keyboard, corresponding in relative position to the key of the displayed keyboard.

34. The apparatus of claim 25, wherein a key of the displayed keyboard is selected through optical scanning.

35. The apparatus of claim 34, further comprising:
  a keyboard, separate from the integrated input and display, for rendering a key of the displayed keyboard, selectable through row-column sequential optical scanning and subsequent activation of a key on the separate keyboard corresponding in position to the key of the displayed keyboard.

36. The apparatus of claim 16, wherein each at least one newly displayed symbol is nonpolysemous.

37. The apparatus of claim 16, wherein the memory temporarily stores a new symbol sequence including the previously stored symbols and the newly displayed symbol, in sequential order of selection, and the control means compares the temporarily stored symbol sequence, including the newly displayed symbol, to the first set of prestored symbol sequences and accesses the prestored message in response to the new symbol sequence including the newly displayed symbol matching one of the first set of prestored symbol sequences.

38. The apparatus of claim 1, wherein the displayed keyboard includes the plurality of keys which each include a displayed polysemous symbol defined to correspond thereto and at least one key which fails to include a corresponding displayed polysemous symbol, wherein keys with or without symbols originally defined to correspond thereto can be dynamically redefined.

39. The apparatus of claim 1, wherein the control means controls the keys of the keyboard with dynamically redefined symbols to be separately displayed.

40. The apparatus of claim 39, wherein the keys separately displayed are relatively increased in size in comparison to a size of originally displayed keys.

41. The apparatus of claim 1, wherein relative to other keys of the keyboard, display of dynamically redefined keys of the keyboard is enlarged.

42. An apparatus, comprising:
  integrated input and display device for displaying a plurality of keys of a displayed keyboard, each of the plurality of keys including a displayed rolvsemous symbol defined to correspond thereto, and for inputting a corresponding polysemous symbol upon selection of a key;
  memory for temporarily storing a symbol sequence including the corresponding polysemous symbol of each selected key, in sequential order of selection; and
  control means for comparing the temporarily stored symbol sequence, in response to each key selection, to a first set of a plurality of prestored symbol sequences, each including at least one symbol in a predetermined sequence and an associated prestored message,
  for comparing the temporarily stored symbol sequence to a second set of a plurality of prestored symbol sequences in response to the temporarily stored symbol sequence failing to match any of the first set of prestored symbol sequences, and
  for dynamically redefining symbols of less than all of the plurality of displayed keys in response to the temporarily stored symbol sequence matching one of the second set of prestored symbol sequences.

43. The apparatus of claim 42, wherein the dynamic redefining of the control means includes embellishing display of a corresponding displayed symbol of at least one of the plurality of keys of the displayed keyboard in response to the temporarily stored symbol sequence matching one of the second set of prestored symbol sequences.

44. The apparatus of claim 43, wherein the control means embellishes display of a corresponding displayed symbol of at least one of the plurality of keys not previously selected.

45. The apparatus of claim 43, wherein each embellished at least one corresponding displayed symbol relates to a common theme represented by the matched symbol sequence of the second set.

46. The apparatus of claim 45, wherein the control means accesses a prestored message associated with an embellished symbol subsequent to a corresponding key being selected.

47. The apparatus of claim 44, further comprising:
  output means for outputting the accessed message.

48. The apparatus of claim 47, wherein the output means includes a voice synthesizer.

49. The apparatus of claim 46, wherein the control means controls the integrated input and display device to display a previously embellished symbol as a non-embellished symbol in response to a corresponding key being selected.

50. The apparatus of claim 46, wherein a key of the displayed keyboard of the integrated input and display device is selectable through physical contact with a key of the displayed keyboard.

51. The apparatus of claim 46, further comprising:
a keyboard, separate from the integrated input and display device, for rendering a key of the displayed keyboard of the integrated input and display device selectable through activation of a key on the separate keyboard, corresponding in relative position to the key of the displayed keyboard.

52. The apparatus of claim 46, wherein a key of the displayed keyboard is selectable through optical scanning.

53. The apparatus of claim 52, further comprising:
a keyboard, separate from the integrated input and display device, for rendering a key of the displayed keyboard, selectable through row-column sequential optical scanning and subsequent activation of a key on the separate keyboard corresponding in position to the key of the displayed keyboard.

54. The apparatus of claim 46, wherein the memory temporarily stores a new symbol sequence including the previously stored symbols and the embellished symbol, in sequential order of selection, and the control means compares the temporarily stored symbol sequence including the embellished symbol, to the first set of prestored symbol sequences and accesses the prestored message in response to the new symbol sequence including the embellished symbol matching one of the first set of prestored symbol sequences.

55. The apparatus of claim 43, wherein the control means accesses a prestored message associated with a prestored symbol sequence in response to the temporarily stored symbol sequence matching one of the first set of prestored symbol sequences.

56. The apparatus of claim 55, wherein the control means accesses a prestored message associated with an embellished symbol in response to a corresponding key being selected.

57. The apparatus of claim 56, wherein the memory temporarily stores a new symbol sequence including the previously stored symbols and the embellished symbol, in sequential order of selection, and the control means compares the temporarily stored symbol sequence, including the embellished symbol, to the first set of prestored symbol sequences and accesses the prestored message in response to the new symbol sequence including the embellished symbol matching one of the first set of prestored symbol sequences.

58. The apparatus of claim 43, wherein at least one embellished corresponding displayed symbol is polysemous.

59. The apparatus of claim 43, wherein, the memory temporarily stores a symbol sequence including a corresponding symbol of each selected key, in sequential order of selection, including a corresponding embellished symbol, upon selection of a key including a corresponding embellished symbol, the control means compares the temporarily stored symbol sequence including a corresponding symbol of each selected key and the corresponding embellished symbol, in sequential order of selection, to a third set of a plurality of prestored symbol sequences, each including at least one symbol and one embellished symbol in a predetermined sequence, and the control means dynamically redefines at least a portion of the displayed keyboard in response to the sequenced at least one corresponding symbol and corresponding embellished symbol matching one of the third set of a plurality of prestored symbol sequences.

60. The apparatus of claim 59, wherein the dynamic redefining of the control means includes displaying a data table on the integrated input and display device.

61. The apparatus of claim 59, wherein the dynamic redefining of the control means includes displaying a window containing subsequently selectable information on the integrated input and display device.

62. The apparatus of claim 59, wherein the dynamic redefining of the control means includes replacing at least one corresponding displayed polysemous symbol of at least one key of the displayed keyboard with a newly displayed symbol, different from the previously displayed corresponding polysemous symbol.

63. The apparatus of claim 62, wherein the dynamic redefining of the control means includes replacing each of a plurality of corresponding displayed polysemous symbols of a plurality of keys of the displayed keyboard with a newly displayed symbol, each different from the previously displayed corresponding polysemous symbol.

64. The apparatus of claim 63, wherein embellishing of each at least one displayed polysemous symbol relates to a common theme represented by the matched symbol sequence of the second set.

65. The apparatus of claim 64, wherein each of the newly displayed symbols relate to a common sub-theme of the common theme, the common sub-theme represented by the temporarily stored symbol sequence matching one of the plurality of prestored symbol sequences of the third set.

66. The apparatus of claim 65, wherein each of the newly displayed symbols are nonpolysemous.

67. The apparatus of claim 65, wherein at least one of the newly displayed symbols replaces the embellished symbol corresponding to the selected key.

68. The apparatus of claim 67, wherein each of the newly displayed symbols is proximate to at least one other newly displayed symbol.

69. The apparatus of claim 65, wherein the control means accesses a prestored message associated with a newly displayed symbol subsequent to a corresponding key being selected.

70. The apparatus of claim 69, further comprising:
output means for outputting a voice synthesization of the accessed message.

71. The apparatus of claim 69, wherein the control means controls the integrated input and display device to display each of the newly displayed symbols as a previously displayed symbol in response to one of the keys including a corresponding newly displayed symbol being selected.

72. The apparatus of claim 69, wherein the memory temporarily stores a new symbol sequence including the previously stored symbols and the newly displayed symbol, in sequential order of selection, and the control means compares the temporarily stored symbol sequence, including the newly displayed symbol, to the first set of prestored symbol sequences and accesses the prestored message in response to the new symbol sequence including the newly displayed symbol matching one of the first set of prestored symbol sequences.

73. The apparatus of claim 63, wherein each of the replaced symbols is of a common display tone so as to render each replaced symbols distinct from non-replaced displayed symbols.

74. The apparatus of claim 63, wherein each of the replaced symbols is of a common brightness so as to render each replaced symbol distinct from non-replaced displayed symbols.

75. The apparatus of claim 63, wherein the control means accesses a prestored message associated with a newly displayed symbol subsequent to a corresponding key being selected.

76. The apparatus of claim 75, further comprising:
output means for outputting a voice synthesization of the accessed message.

77. The apparatus of claim 75, wherein the control means controls the integrated input and display device to display each of the at least one newly displayed symbol as a previously displayed symbol in response to detecting selection of a corresponding key being selected.

78. The apparatus of claim 75, wherein a key of the displayed keyboard of the integrated input and display device is selectable through physical contact with a key of the displayed keyboard.

79. The apparatus of claim 75, further comprising:
a keyboard, separate from the integrated input and display device, for rendering a key of the displayed keyboard of the integrated input and display device selectable through activation of a key on the separate keyboard, corresponding in relative position to the key of the displayed keyboard.

80. The apparatus of claim 75, wherein:
a key of the displayed keyboard is selected through optical scanning.

81. The apparatus of claim 80, further comprising:
a keyboard, separate from the integrated input and display device, for rendering a key of the displayed keyboard, selectable through row-column sequential optical scanning and subsequent activation of a key on the separate keyboard corresponding in position to the key of the displayed keyboard.

82. The apparatus of claim 75, wherein the memory temporarily stores a new symbol sequence including the previously stored symbols and the newly displayed symbol, in sequential order of selection, and the control means compares the temporarily stored symbol sequence, including the newly displayed symbol, to the first set of prestored symbol sequences and accesses the prestored message in response to the new symbol, sequence including the newly displayed symbol matching one of the first set of prestored symbol sequences.

83. The apparatus of claim 43, wherein the embellishing includes adding a word displayed with a corresponding displayed symbol.

84. The apparatus of claim 43, wherein the embellishing includes modifying a displayed symbol.

85. The apparatus of claim 43, wherein the embellishing includes varying color of a displayed symbol.

86. The apparatus of claim 43, wherein each of the at least one embellished corresponding displayed symbols is displayed on the integrated input and display device so as to render each of the at least one embellished corresponding displayed symbols distinct from non-embellished displayed symbols.

87. The apparatus of claim 14, wherein each embellished symbol is varied in brightness with respect to non-embellished symbols.

88. The apparatus of claim 42, wherein the displayed keyboard includes the plurality of keys which each include a displayed polysemous symbol defined to correspond thereto and at least one key which fails to include a corresponding displayed polysemous symbol, wherein keys with or without symbols originally defined to correspond thereto can be dynamically redefined.

89. The apparatus of claim 42, wherein the control means controls the keys of the keyboard with dynamically redefined symbols to be separately displayed. separately displayed are relatively increased in size in comparison to a size of originally displayed keys.

90. An apparatus, comprising:
integrated input and display device for displaying a plurality of keys of a displayed keyboard, each of the plurality of keys including a displayed polysemous symbol defined to correspond thereto, and for inputting a corresponding polysemous symbol upon selection of a key;
memory for temporarily storing a symbol sequence including the corresponding polysemous symbol of each selected key, in sequential order of selection; and
control means for comparing the temporarily stored symbol sequence, in response to each key selection, to a plurality of prestored symbol sequences, each including at least one symbol in a predetermined sequence, and for dynamically redefining symbols of less than all of the plurality of displayed keys of the integrated input and display device in response to the temporarily stored symbol sequence matching at least one of the plurality of prestored symbol sequences.

91. The apparatus of claim 42, wherein relative to other keys of the keyboard, display of dynamically redefined keys of the keyboard is enlarged.

92. An apparatus, comprising:
integrated input and display device for displaying a plurality of keys of a displayed keyboard, each of the plurality of keys including a displayed polysemous symbol defined to correspond thereto, and for inputting a corresponding polysemous symbol upon selection of a key;
memory for storing a plurality of symbol sequences, each associated with a prestored dynamic category;
control means for detecting, in sequence, selection of a plurality of keys of the displayed keyboard, for accessing a prestored dynamic category based upon the sequence of polysemous symbols of detected keys selected, and for embellishing a plurality of displayed key symbols of the integrated input and display device based upon the accessed prestored dynamic category, to dynamically redefine symbols of keys of the displayed keyboard.

93. The apparatus of claim 92, wherein the keys corresponding to embellished symbols form a keyboard corresponding to the accessed prestored dynamic category.

94. The apparatus of claim 92, wherein the control means further renders the embellished symbols distinct from non-embellished symbols.

95. The apparatus of claim 94, wherein the control means further detects selection of a key corresponding to an embellished symbol and further accesses a prestored message, stored in the memory in association with the embellished symbol, in response to the detected selection of a corresponding key.

96. The apparatus of claim 95, further comprising:
output means for outputting the accessed message.

97. The apparatus of claim 92, therein the control means further detects selection of a key corresponding to an embellished symbol and further accesses a prestored dynamic subcategory, stored in memory in association with the embellished symbol, in response to the detected selection of a corresponding key.

98. The apparatus of claim 97, wherein the control means further displays a plurality of new symbols on the integrated input and display device in place of previously displayed polysemous key symbols based upon the accessed prestored dynamic subcategory, to further dynamically redefine symbols of keys of the displayed keyboard.

99. The apparatus of claim 98, wherein the control means further detects selection of a key corresponding to a newly displayed symbol and further accesses a prestored message, stored in the memory in association with the embellished symbol, in response to the detected selection of a corresponding key.

100. The apparatus of claim 92, wherein the displayed keyboard includes the plurality of keys which each include a displayed polysemous symbol defined to correspond thereto and at least one key which fails to include a corresponding displayed polysemous symbol, wherein keys with or without symbols originally defined to correspond thereto can be dynamically redefined.

101. The apparatus of claim 92, wherein the control means controls the keys of the keyboard with dynamically redefined symbols to be separately displayed.

102. The apparatus of claim 101, wherein the keys separately displayed are relatively increased in size in comparison to a size of originally displayed keys.

103. The apparatus of claim 92, wherein relative to other keys of the keyboard, display of dynamically redefined keys of the keyboard is enlarged.

104. An apparatus, comprising:
integrated input and display device for displaying a plurality of keys of a displayed keyboard, each of the Plurality of keys including a corresponding displayed polysemous symbol, and for inputting a corresponding polvsemous symbol upon selection of a key;
memory for storing a plurality of symbol sequences, each associated with a prestored dynamic category;
control means for detecting, in sequence, selection of a plurality of keys of the displayed keyboard, for accessing a prestored dynamic category based upon the sequence of polysemous symbols of detected keys selected, and for displaying keys with a plurality of new symbols in place of or simultaneous with a plurality of keys with previously displayed polysemous key symbols of the integrated input and display device based upon the accessed prestored dynamic category, to dynamically redefine the displayed keyboard to include keys with new symbols.

105. The apparatus of claim 104, wherein the keys corresponding to newly displayed symbols form a keyboard corresponding to the accessed prestored dynamic category.

106. The apparatus of claim 104, wherein the control means further renders the newly displayed symbols distinct from previously displayed polysemous symbols.

107. The apparatus of claim 106, wherein the control means further detects selection of a key corresponding to a newly displayed symbol and further accesses a prestored message, stored in the memory in association with the newly displayed symbol, in response to the detected selection of a corresponding key.

108. The apparatus of claim 107, further comprising:
output means for outputting the accessed message.

109. The apparatus of claim 104, wherein the displayed keyboard includes the plurality of keys which each include a corresponding displayed polysemous symbol and at least one key which fails to include a corresponding displayed polysemous symbol, wherein keys with or without originally corresponding symbols can be dynamically redefined.

110. The apparatus of claim 104, wherein the control means controls only the keys of the keyboard with new symbols to be separately displayed.

111. The apparatus of claim 110, wherein keys separately displayed are relatively increased in size in comparison to a size of originally displayed keys.

112. The apparatus of claim 104, wherein relative to other keys of the keyboard, display of keys of the keyboard with new symbols is enlarged.

113. An apparatus comprising:
keyboard, including a plurality of keys with polysemous symbols defined to correspond thereto, for inputting a corresponding polysemous symbol upon selection of a key;
memory for temporarily storing a symbol sequence including the corresponding polysemous symbol of each selected key in sequential order of selection;
control means for comparing the temporarily stored symbol sequence, in response to each key selection, to a plurality of prestored symbol sequences, each including at least one symbol in a predetermined sequence;
display for displaying a plurality of embellished symbols, embellished from the polysemous symbols corresponding to the plurality of keys, in response to the temporarily stored symbol sequence matching at least one of the plurality of prestored symbol sequences, the control means dynamically redefining symbols of keys on the keyboard to correspond, respectively, to the displayed embellished symbols.

114. The apparatus of claim 113, wherein the display displays polysemous symbols positionally corresponding to at least some of the polysemous symbols of keys on the keyboard, and embellishes previously displayed polysemous symbols in response to the temporarily stored symbol sequence matching at least one of the plurality of prestored symbol sequences.

115. The apparatus of claim 112, wherein a plurality of keys of the keyboard include corresponding indicators, the indicators of dynamically redefined keys being activated for association of dynamically redefined keys and relative positionally corresponding embellished displayed symbols.

116. The apparatus of claim 113, said control means comparing the temporarily stored symbol sequence, in response to each key selection, to a first set of a plurality of prestored symbol sequences, each including at least one symbol in a predetermined sequence and an associated prestored message,
comparing the temporarily stored symbol sequence to a second set of a plurality of prestored symbol sequences in response to the temporarily stored symbol sequence failing to match any of the first set of prestored symbol sequences, and
dynamically redefining symbols of keys in response to the temporarily stored symbol sequence matching one of the second set of prestored symbol sequences.

117. The apparatus of claim 116, further comprising:
output means for outputting a message accessed by the control means in response to the temporarily stored symbol sequence matching a corresponding one of the first set of prestored symbol sequences.

118. The apparatus of claim 117, wherein the control means further detects selection of a key corresponding to a displayed embellished symbol and further accesses a prestored message, stored in the memory in association with the displayed embellished symbol, in response to the detected selection of a corresponding key.

119. The apparatus of claim 113, wherein displayed embellished symbols are of a common theme.

120. The apparatus of claim 113, wherein the control means accesses one of a plurality of prestored dynamic categories, each prestored in the memory in association with a prestored symbol sequence, in response to the temporarily stored symbol sequence matching one of the plurality of prestored symbol sequences, the control means controlling the display to display the plurality of embellished symbols, each associated with a common theme of the accessed dynamic category.

121. The apparatus of claim 113, wherein the displayed keyboard includes the plurality of keys which each include a displayed polysemous symbol defined to correspond thereto and at least one key which fails to include a corresponding displayed polysemous symbol, wherein keys with or without symbols originally defined to correspond thereto can be dynamically redefined.

122. The apparatus of claim 113, wherein the display separately displays keys of the keyboard with new symbols.

123. The apparatus of claim 122, wherein the keys separately displayed are relatively increased in size in comparison to a size of originally displayed keys.

124. The apparatus of claim 113, wherein relative to other keys of the keyboard, display of keys of the keyboard with new symbols is enlarged.

* * * * *

UNITED STATES PATENT AND TRADEMARK OFFICE
CERTIFICATE OF CORRECTION

PATENT NO. : 5,920,303  
APPLICATION NO. : 08/990740  
DATED : July 6, 1999  
INVENTOR(S) : Bruce R. Baker et al.

Page 1 of 2

It is certified that error appears in the above-identified patent and that said Letters Patent is hereby corrected as shown below:

Col. 43 lines 33-51 should read
1. An apparatus, comprising:
integrated input and display device for displaying a plurality of keys of a displayed keyboard, each of the plurality of keys including a displayed polysemous symbol defined to correspond thereto, and for inputting a corresponding polysemous symbol upon selection of a key;
memory for <u>temporarily</u> storing a symbol sequence including the corresponding polysemous symbol of each selected key, in sequential order of selection; and
control means for comparing the temporarily stored symbol sequence, in response to each key selection, to a plurality of prestored symbol sequences, each including at least one symbol in a ~~predetemined~~ predetermined sequence, and for dynamically redefining symbols of less than all of the plurality of displayed keys of the integrated input and display device in response to the temporarily stored symbol sequence matching at least one of the plurality, of prestored symbol sequences.

Col. 46 lines 17-41 should read
42. An apparatus, comprising:
integrated input and display device for displaying a plurality of keys of a displayed keyboard, each of the plurality of keys including a displayed ~~polvsemous~~ polysemous symbol defined to correspond thereto, and for inputting a corresponding polysemous symbol upon selection of a key;
memory for temporarily storing a symbol sequence including the corresponding polysemous symbol of each selected key, in sequential order of selection; and
control means for comparing the temporarily stored symbol sequence, in response to each key selection, to a first set of a plurality of prestored symbol sequences, each including at least one symbol in a predetermined sequence and an associated prestored message,
for comparing the temporarily stored symbol sequence to a second set of a plurality of prestored symbol sequences in response to the temporarily stored symbol sequence failing to match any of the first set of prestored symbol sequences, and
for dynamically redefining symbols of less than all of the plurality of displayed keys in response to the temporarily stored symbol sequence matching one of the second set of prestored symbol sequences.

Signed and Sealed this
Fourteenth Day of February, 2012

David J. Kappos
*Director of the United States Patent and Trademark Office*

CERTIFICATE OF CORRECTION (continued)
U.S. Pat. No. 5,920,303

Col. 49 lines 63-67 should read

89. The apparatus of claim 42, wherein the control means controls the keys of the keyboard with dynamically redefined symbols to be separately displayed. ~~separately displayed are relatively increased in size in comparison to a size of originally displayed keys.~~

Col. 51 lines 22-41 should read

104. An apparatus, comprising:

integrated input and display device for displaying a plurality of keys of a displayed keyboard, each of the plurality of keys including a corresponding displayed polysemous symbol, and for inputting a corresponding ~~polvsemous~~ polysemous symbol upon selection of a key;

memory for storing a plurality of symbol sequences, each associated with a pre stored dynamic category;

control means for detecting, in sequence, selection of a plurality of keys of the displayed keyboard, for accessing a prestored dynamic category based upon the sequence of polysemous symbols of detected keys selected, and for displaying keys with a plurality of new symbols in place of or simultaneous with a plurality of keys with previously displayed polysemous key symbols of the integrated input and display device based upon the accessed prestored dynamic category, to dynamically redefine the displayed keyboard to include keys with new symbols.